(12) United States Patent
Amemiya

(10) Patent No.: US 8,751,406 B2
(45) Date of Patent: Jun. 10, 2014

(54) POINT BANK SYSTEM

(75) Inventor: Kanae Amemiya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 2060 days.

(21) Appl. No.: 10/481,124

(22) PCT Filed: Jul. 30, 2002

(86) PCT No.: PCT/JP02/07753
§ 371 (c)(1),
(2), (4) Date: Dec. 18, 2003

(87) PCT Pub. No.: WO03/017158
PCT Pub. Date: Feb. 27, 2003

(65) Prior Publication Data
US 2004/0167839 A1    Aug. 26, 2004

(30) Foreign Application Priority Data

Jul. 31, 2001  (JP) .................. 2001-231976

(51) Int. Cl.
*G06Q 10/00*    (2012.01)
(52) U.S. Cl.
USPC .......................... 705/307; 705/1.1
(58) Field of Classification Search
USPC ........................ 705/1, 10, 1.1, 307
See application file for complete search history.

(56) References Cited

U.S. PATENT DOCUMENTS

| | | | | |
|---|---|---|---|---|
| 5,806,045 A | * | 9/1998 | Biorge et al. ............ | 705/14 |
| 5,956,698 A | | 9/1999 | Lacheze et al. | |
| 6,578,012 B1 | * | 6/2003 | Storey ....................... | 705/14 |
| 2002/0046091 A1 | * | 4/2002 | Mooers et al. ............ | 705/14 |
| 2003/0032474 A1 | * | 2/2003 | Kaminkow ................ | 463/25 |
| 2003/0033203 A1 | | 2/2003 | Inoue et al. | |
| 2004/0078273 A1 | * | 4/2004 | Loeb et al. ................ | 705/26 |

FOREIGN PATENT DOCUMENTS

| | | |
|---|---|---|
| EP | 1 113 365 A1 | 7/2001 |
| EP | 1113365 A1 * | 7/2001 |
| JP | 3-256062 | 11/1991 |
| JP | 3047956 | 2/1998 |
| JP | 10-326119 A | 12/1998 |
| JP | 11-143669 | 5/1999 |
| JP | 11-250353 | 9/1999 |
| JP | 11-338696 A | 12/1999 |
| JP | 2000-293740 A | 10/2000 |
| JP | 2000-331244 A | 11/2000 |
| JP | 2001-34846 A | 2/2001 |
| JP | 2001-156952 A | 6/2001 |
| JP | 2001-184534 | 7/2001 |

OTHER PUBLICATIONS

European Search Report dated Jul. 19, 2007, directed to counterpart EP Application No. 02751812.5.
Japanese Notice of Rejection mailed Jul. 26, 2011, directed to Japanese Application No. 2001-231976; 4 pages.

* cited by examiner

*Primary Examiner* — Jami A Plucinski
*Assistant Examiner* — Fathi Abdelsalam
(74) *Attorney, Agent, or Firm* — Morrison & Foerster LLP

(57) ABSTRACT

A maintenance management side manages machine information and the installed number of machines such as a copier, a printer, a facsimile, a digital multi-functional apparatus, and a scanner, and exchanges the usage number for each machine for a point value, based on the machine information and the installed number of machines. A service is provided to the user based on the point value. In addition, the service to the user can be utilized through each machine provided at the user side.

19 Claims, 20 Drawing Sheets

FIG.3

USER INFORMATION DATABASE 121

| USER ID | PASS WORD | NAME (CONTACT PERSON) | ADDRESS | TEL No. | E-MAIL ADDRESS | MACHINE ID GROUP | CONTRACT CONTENTS | PAYMENT INFORMATION | POINT INFORMATION |
|---------|-----------|----------------------|---------|---------|----------------|------------------|-------------------|---------------------|-------------------|
| RRR | ******** | RRR,... | TOKYO... | 03-... | rrr@... | 1...,2... | ......... | ......... | ......... |
| ... | ... | ... | ... | ... | ... | ... | ... | ... | ... |

FIG.4

COUNTER INFORMATION DATABASE 122

| MACHINE ID | COUNTER VALUE | JOB TYPE | JOB EXECUTED DATE AND TIME |
|---|---|---|---|
| 12345678 | 11111111 | COPY | '01, 7, 1  9:31 |
| 23456789 | 01111112 | PRINTER | '01, 7, 1  10:11 |
| 34567890 | 00111113 | FAX SEND | '01, 7, 1  10:24 |
| 45678901 | 00011114 | SCAN | '01, 7, 1  11:45 |
| 34567890 | 00111114 | FAX RECEIVE | '01, 7, 1  13:02 |
| ... | ... | ... | ... |

FIG.5

SERVICE DATABASE 123

| SERVICE ID | REQUIRED POINTS | SERVICE EXPLANATION | SERVICE INFORMATION |
|---|---|---|---|
| 00120034 | 10000 | FREE COPY OF 100 SHEETS | ......... |
| 00526540 | 50000 | 5% DISCOUNT OF COPY CHARGE | ......... |
| 01104631 | 50000 | FREE SUPPLY OF 500 COPY SHEETS | ......... |
| 04234240 | 100000 | FREE SUPPLY OF TONER | ......... |
| 05670350 | 100000 | 10% DISCOUNT OF PRICE OF SUPPLY PRODUCT | ......... |
| 15243830 | 10000 | FREE MAINTENANCE SERVICE | ......... |
| ... | ... | ... | ... |

FIG.6

MACHINE INFORMATION DATABASE 124

| MACHINE ID | MACHINE INFORMATION | CONNECTION INFORMATION |
|---|---|---|
| 102301723575 | ......... | ......... |
| 102302349018 | ......... | ......... |
| 102303918273 | ......... | ......... |
| 230401041094 | ......... | ......... |
| 230402306093 | ......... | ......... |
| 410202727575 | ......... | ......... |
| ... | ... | ... |

FIG.9A

AVAILABLE SERVICE LIST SCREEN

POINT BALANCE  1234567890 p          (2 of 3 pages)

| AVAILABLE SERVICE LIST | REQUIRED POINTS |
|---|---|
| 5% DISCOUNT OF COPY CHARGE | 5000 p |
| FREE COPY OF 100 SHEETS | 10000 p |
| FREE MAINTENANCE SERVICE | 10000 p |
| FREE SUPPLY OF 500 COPY SHEETS | 50000 p |

PREVIOUS PAGE     SELECT     NEXT PAGE

FIG.9B

SELECTED SERVICE EXPLANATION SCREEN

SELECTED SERVICE: FREE COPY OF 100 SHEETS

POINT BALANCE AFTER UTILIZATION  1234557890 p

SERVICE EXPLANATION

- FREE COPY OF 100 SHEETS AFTER UTILIZING

BACK                                   UTILIZE SERVICE

FIG.14A

SERVICE TYPE LIST SCREEN

POINT BALANCE    1234567890  p        (2 of 3 pages)

SERVICE TYPE LIST

| FREE COPY | 5 TYPES |
| MAINTENENCE FEE DISCOUNT | 3 TYPES |
| FREE SUPPLY PRODUCT | 11 TYPES |
| SUPPLY PRODUCT DISCOUNT | 35 TYPES |

⋮                    ⋮

SELECT

FIG.14B

EACH TYPE AVAILABLE SERVICE LIST SCREEN

SELECTION SERVICE TYPE: FREE COPY

AVAILABLE SERVICE LIST          NECESSARY POINT(S)

| FREE 50 SHEETS FOR COPY | 5000 p |
| FREE 100 SHEETS FOR COPY | 10000 p |
| FREE 200 SHEETS FOR COPY | 15000 p |

⋮                    ⋮

BACK

PREVIOUS PAGE    SELECT    NEXT PAGE

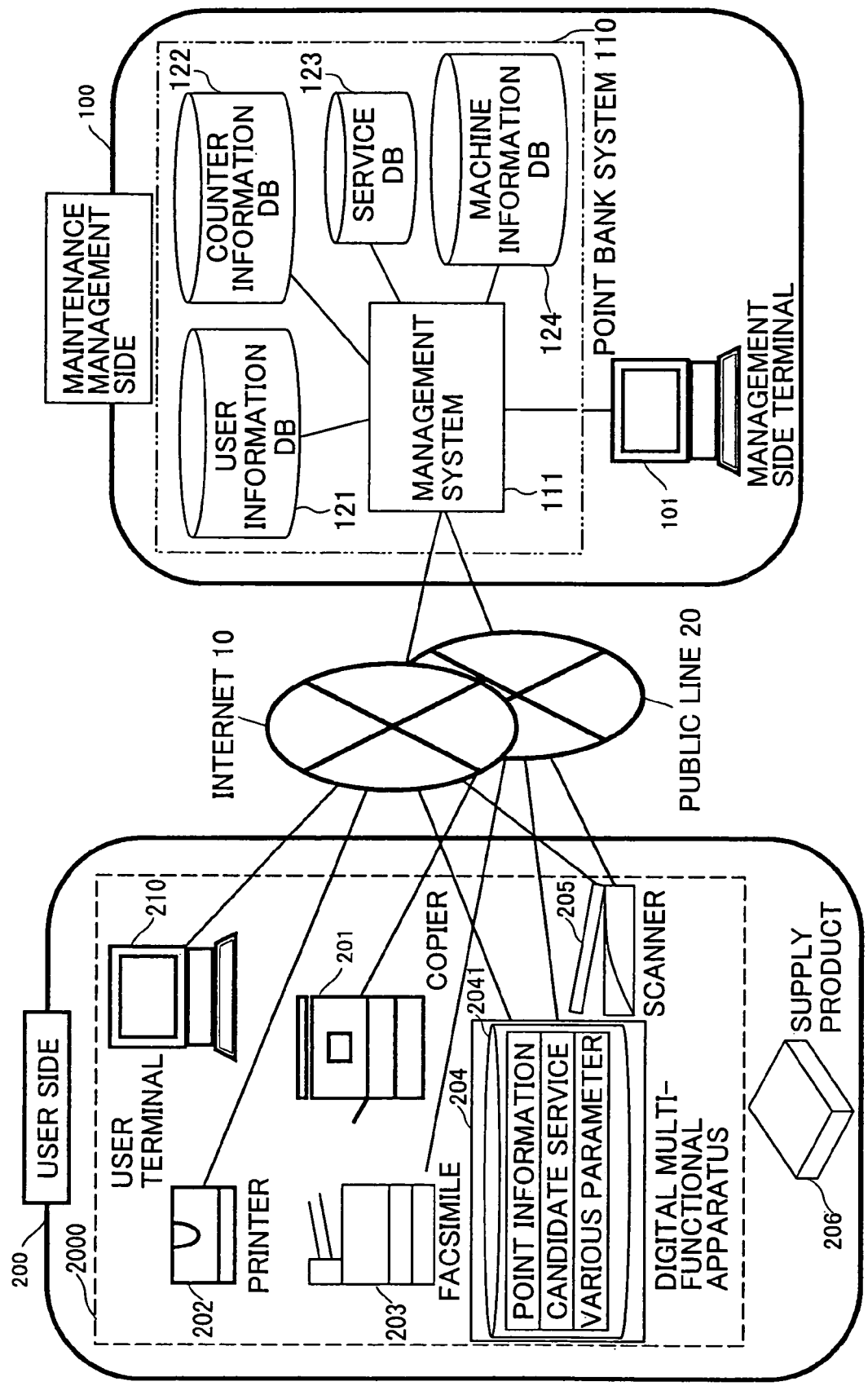

FIG.17

COUNTER INFORMATION DATABASE 122

| MACHINE ID | CARD ID | COUNTER VALUE | JOB TYPE | JOB EXECUTED DATE AND TIME |
|---|---|---|---|---|
| 12345678 | 001 | 11111111 | COPY | '01,7,1 9:31 |
| 12345678 | 002 | 01111112 | COPY | '01,7,1 10:11 |
| 34567890 | 003 | 00111113 | FAX SEND | '01,7,1 10:24 |
| 45678901 | 002 | 00011114 | SCAN | '01,7,1 11:45 |
| 34567890 | 003 | 00111114 | FAX RECEIVE | '01,7,1 13:02 |
| ... | ... | ... | ... | ... |

FIG.18

USER INFORMATION DATABASE 121

| USER ID | PASS WORD | NAME (CONTACT PERSON) | ADDRESS | TEL No. | E-MAIL ADDRESS | MACHINE ID GROUP |
|---|---|---|---|---|---|---|
| RRR | ******** | RRR,··· | TOKYO··· | 03—···· | rrr@··· | 1···,2···,··· |
|  |  |  |  |  |  |  |
|  |  |  |  |  |  |  |
| ··· | ··· | ··· | ··· | ··· | ··· | ··· |

| CARD ID GROUP | CONTRACT CONTENTS | PAYMENT INFORMATION | POINT INFORAMTION |
|---|---|---|---|
| 001,002,··· | ········ | ········ | ········ |
|  |  |  |  |
|  |  |  |  |
| ··· | ··· | ··· | ··· |

POINT BANK SYSTEM

FIELD OF THE INVENTION

The present invention generally relates to a point bank system, a point bank apparatus, and a point bank terminal, a method for accumulating points, and a method for providing service

DESCRIPTION OF RELATED ART

Generally, a digital multi-functional apparatus mounting a copier or a function for copying or a like is provided as a leased apparatus or as merchandise which a user purchases, from a maker selling or providing a maintenance management service.

In addition, the maker provides the main part of the copier and the digital multi-functional apparatus as well as a maintenance management service such as a machine check, a repair, an adjustment, and a like.

The cost of the maintenance management service depends on the number of copies and is calculated by a charge per paper sheet.

To realize this, generally, a counter is provided in the copier or the digital multi-functional apparatus provided as described above. Using this counter, the maker counts how many times the user uses the copier for a predetermined period, for example, one month, and calculates the maintenance management charge.

As for the counter as described above, there are a so-called mechanical counter and a so-called software counter. The mechanical counter physically exists and maintains a count value of the number of copies. And the software counter electrically stores the count value.

In recent years, such as the maker has provided a service discounting the maintenance management charge. This service discounts the copying charge per paper sheet when the user utilizes the copier more than a set value.

However, as described above, the service currently provided to discount the maintenance management charge simply discounts the copying charge when the copying number exceeds the set value. Thus, service tailored for each user is not provided.

In addition, conventionally, the service is simply provided without considering a user utilizing the service for a long time, a user installing many machines, or a user requiring a lesser number of maintenance visits, who is a preferable user. Since the service is equally provided to all users, the maker has not provided the service to each user based on various benefits.

Moreover, since in the service currently provided, the user pays a charge with respect to a usage amount to the maker, the user has not received any additional service suitable for the charge of the usage amount.

Furthermore, in the service currently provided, only the copying number is referred to. Thus, for example, even if the user installs a machine such as a printer, a facsimile, a scanner, or a like in addition to an existing printer or digital multi-functional apparatus, any special extra service corresponding to the number of times using these machines has not been provided to the user.

SUMMARY OF THE INVENTION

It is a general object of the present invention to provide a point bank system, a point bank apparatus, and a point bank terminal, a method for accumulating points, and a method for providing service, in which the above-mentioned problems are eliminated.

A more specific object of the present invention is to provide the point bank system, the point bank apparatus, and the point bank terminal, the method for accumulating points, the method for providing service, and the computer-readable recording medium recorded with program code thereof, in which a service suitable for each user can be provided.

In order to achieve the above objects, in a first aspect, the present invention can provide a point bank system for managing a point value calculated based on a usage number of a machine provided at a user side, including a usage number maintaining part maintaining a usage number for each machine, the usage number collected through the network, a point exchanging part exchanging the usage number of each machine maintained in the usage number maintaining part for the point value; a point accumulating part accumulating the point value exchanged by the point exchanging part.

Accordingly, in the present invention, it is possible to provide services suitable for each user. That is, based on the usage number of the machines provided at the user side, the point value necessary to utilize the services, it is possible to provide more services or higher quality services for the user having a greater usage number. In addition, as for the maintenance management side providing the machines, a greater installed number of the machines and a greater usage number can be expected. Accordingly, it is possible to receive a higher benefit.

Moreover, in a second aspect, the present invention may provide the point bank system wherein: the user side comprises at least one person or at least one section; the point exchanging part exchanges the points for each person or each section; and the point accumulating part accumulates the points for each person or each section.

Accordingly, in the present invention, it is possible to provide more specific services suitable for each user. That is, for the same user, it is possible to provide more services or higher quality services to an individual or a section that uses the machine more.

Furthermore, in a third aspect, the present invention may provide the point bank system further including: a candidate service determining part determining at least one candidate service to provide, based on the point value accumulated in the point bank system; a service utilizing screen creating part creating at least one service utilizing screen for utilizing the service, based on the service determined by the candidate service determining part; a service utilizing screen sending part sending the service utilizing screen created by the service utilizing screen creating part to the machine through a network; and a service providing part providing a service, which the user selects from the service utilizing screen at the machine at the user side, based on a service selection sent from the machine, whereby the service is provided to the user based on the point value accumulated in the point bank system.

Accordingly, in the present invention, it is possible to utilize the services by using an accumulative point value at the machine at the user side. Thus, it is possible to provide an environment allowing the user to easily utilize the services. In addition, the maintenance management side can improve the value for utilizing the services provided according to the present invention. Thus, it is possible to have an increase of the number of the users who make use of the services according to the present invention.

Moreover, in a fourth aspect, the present invention can provide a machine, which is provided to a user side and capable of connecting to a point bank system managing a point value calculated based a usage number at the machine, including: a usage number sending part sending the usage number to the point bank system; a point balance specifying part specifying a point balance accumulated in the point bank system; and a point balance displaying part displaying the point balance specified by the point balance specifying part.

Accordingly, in the present invention, it is possible to confirm the point balance in respect to an accumulative point value at the machine at the user side. Thus, it is possible to promote greater user of the machine to the user.

Furthermore, in a fifth aspect, the present invention can provide a machine including: a service utilizing screen displaying part displaying a service utilizing screen for utilizing a service received from a point bank system that provides the service to a user based on an accumulative point value; and a selected service sending part sending a service selection, which is input by the user based on the service utilizing screen displayed by the service utilizing screen displaying part.

Accordingly, in the present invention, it is possible to utilize the services by using the accumulative point value at the machine at the user side. Thus, it is possible to provide an environment allowing the user to easily utilize the services. In addition, the maintenance management side can improve the value for utilizing the services provided according to the present invention. Thus, it is possible to have an increase of the number of the users who make use of the services according to the present invention.

Moreover, in a sixth aspect, the present invention can provide a machine including: a point balance specifying part specifying a point balance accumulated in a point bank system, which manages a point value calculated based on a usage number of a machine provided at a user side; a self usage point exchanging part exchanging the usage number of the machine for the point value: and a self usage point adding part adding the point value exchanged by the self usage point exchanging part to the point balance specified by the point balance specifying part.

Accordingly, in the present invention, since the point balance is managed at the machine at the user side, it is possible to promptly provide the services to the user at a time when the point balance reaches a predetermined value. In addition, the maintenance management side can improve the value for utilizing the services provided according to the present invention. Thus, it is possible to have an increase of the number of the users who make use of the services according to the present invention.

Furthermore, in a seventh aspect, the present invention may provide the machine further including: a candidate service determining part determining at least one candidate service to provide, based on the point balance obtained by the self usage point adding part; a service utilizing screen creating part creating at least one service utilizing screen for utilizing a service, based on the candidate service determined by the candidate service determining part; a service utilizing screen displaying part displaying the service utilizing screen created by the service utilizing screen creating part; a service selection obtaining allowing a user of the machine to select a service as a service selection from the candidate services shown in the service utilizing screen so as to obtain the service selection; and a service selection processing part processing the service selection by either one of providing the service to the user based the service selection and sending the service selection input by the user to the point bank system connected through a network.

Accordingly, in the present invention, it is possible to promptly utilize the services based on the accumulative points at the machine at the user side. In addition, since the maintenance management side can improve the value for utilizing the services provided according to the present invention, it is possible to have the increase of the number of the users who make use of the services according to the present invention.

Moreover, in an eighth aspect, the present invention can provide a machine for generating counter information, including a counter information generating part canceling the counter information generated by a predetermined usage number of a machine where a computer is provided, or suppressing the generation of the counter information for the predetermined usage number of the machine.

Accordingly, in the present invention, it is possible to provide the services that can be free corresponding to usage of the machine.

Furthermore, in a ninth aspect, the present invention can provide a terminal including: a point balance specifying part specifying a point balance accumulated in a point bank system, which manages a point value calculated based on a usage number of a machine provided at a user side; and a point balance displaying part displaying the point balance specified by the point balance specifying part.

Accordingly, in the present invention, it is possible to confirm the point balance of any one of terminals from that terminal itself at the user side. Thus, it is possible to promote greater use of the machines by the user.

Moreover, in a tenth aspect, the present invention can provide a terminal including: a service utilizing screen obtaining part obtaining a service utilizing screen for utilizing a service, from a point bank system, which manages a point value calculated based on a usage number of a machine provided at a user side; a service utilizing screen displaying part displaying the service utilizing screen obtained from the point bank system; and a service selection sending part sending a service selection input based on the service utilizing screen displayed by the service utilizing screen displaying part, to the point bank system through a network Accordingly, in the present invention, it is possible to utilize the services based on the point balance of any one of the terminals from that terminal itself at the user side. Thus, it is possible to provide an environment allowing the user to utilize the services in a state suitable for the user.

Furthermore, in an eleventh aspect, the present invention can provide a method for accumulating a point value, including the steps of: (a) exchanging a usage number for each machine provided at a user side for the point value; and (b) accumulating the point value obtained in the step (a).

Accordingly, in the present invention, it is possible to provide the services that meet requirements for each user. That is, since a necessary point value to utilize the services is given based on a usage number of the machine provided at the user side, it is possible to provide more services or higher quality services for the user whose usage number is greater. In addition, since the maintenance management side providing the machine can expect an increase in installations of the machines and the usage number of the machines, it is possible to improve profits.

Moreover, in a twelfth aspect, the present invention may provide a method that exchanges the usage number of each machine for the point value based on any selection of each machine, each job type executed by the machine, and the number of machines provided at the user side.

Accordingly, in the present invention, it is possible to provide or utilize the services properly to or by each user based on the machine or functions used by the user and the number of the machines contracted for by the user.

Furthermore, in a thirteenth aspect, the present invention may provide a method of setting a predetermined point value to the user who installs a new machine and/or replaces an installed machine with another machine.

Accordingly, in the present invention, it is possible to provide more services or higher quality service in respect to the user who installs a new machine or replaces an installed machine. Thus, it is possible to improve the installation rate of the machine. In addition, it is possible to provide the service suitable to a new installation or a machine replacement, to the user side.

Moreover, in a fourteenth aspect, the present invention may provide a method that sets a predetermined point value for the user who replaces the installed machine with another machine, to be a different point value corresponding to contract years of the installed machine.

Accordingly, in the present invention, it is possible to provide more services or higher quality services to the user who replaces the machine. Thus, it is possible to determine a cycle of replacing the machine closer to a period desired by the maintenance management side.

Furthermore, in a fifteenth aspect, the present invention may provide a method of setting a predetermined point value for the user who purchases or utilizes a supply product.

Accordingly, in the present invention, it is possible to provide an additional point value for purchase or utilization of a supply product, the charged maintenance, the repair provided by the maintenance management side as well as the usage of the machine, the new installation of the machine, or the replacement. Thus, it is possible to provide the services considering more purchases or more utilization. In addition, it is possible for the maintenance management side to have an increase of purchases and the installation rate and also to have an improvement in profit.

Moreover, in a sixteenth aspect, the present invention can provide a method for providing a service, including the steps of: (a) determining at least one candidate service to provide, based on a usage number of each machine provided at a user side; (b) creating a service utilizing screen for utilizing a service based on the candidate service determined in the step (a); and (c) providing a service selected by the user, based on a service selection that the user inputs based on the service utilizing screen created in the step (b).

Accordingly, in the present invention, it is possible to provide the services based on the accumulative point value. Thus, it is possible to have an increase of machine installations and machine usage. In addition, it is possible for the user to receive the services corresponding to the machines installed from the maintenance management side and the machine usage. Thus, it is possible to have an increase of the number of users who make use of the services according to the present invention.

Furthermore, in a seventeenth aspect, the present invention can provide a program for causing a computer serving as a terminal at a user side to calculate a point balance, the program including the code for: (a) specifying the point balance managed in a point bank system that exchanges a usage number of each machine provided at the user side for a point value and accumulating the point value; (b) exchanging the usage number of the machines for the point value; and (c) adding the point value exchanged by the code (b) to the point balance specified by the code (a).

Accordingly, in the present invention, since the point balance is managed at the machine at the user side, it is possible to promptly provide the services to the user at a time the point balance reaches a predetermined value. In addition, since the maintenance management side can improve the value for utilizing the services provided according to the present invention, it is possible to have an increase of the number of the users who make use of the services according to the present invention.

Moreover, in an eighteenth aspect, the present invention can provide the program, further including the code for: (d) determining at least one candidate service to provide, based on a point balance obtained by the code (b); (e) creating at least one service utilizing screen for utilizing a service, based on the candidate service determined by the code (d); and (f) displaying the service utilizing screen created by the code (e).

Accordingly, in the present invention, it is possible to promptly provide the services based on the accumulative point value in the machine at the user side. In addition, since the maintenance management side can improve the value for utilizing the services provided according to the present invention, it is possible to have an increase of the number of users who make use of the services according to the present invention.

Furthermore, in a nineteenth aspect, the present invention can provide a program for causing a computer to create counter information, the program including the code for: canceling the counter information generated by a predetermined usage number of a machine where the computer is provided or suppressing the generation of the counter information for the predetermined usage number of the machine.

Accordingly, in the present invention, it is possible to provide services that can be free corresponding to usage of the machine.

BRIEF DESCRIPTION OF THE DRAWINGS

Other objects, features, and advantages of the present invention will become more apparent from the following detailed description when read in conjunction with the accompanying drawings, in which:

FIG. 3 is a table showing an example of a data structure of a user information database according to the first embodiment of the present invention;

FIG. 4 is a table showing an example of a data structure of a counter information database according to the first embodiment of the present invention;

FIG. 5 is a table showing an example of a data structure of a service database according to the first embodiment of the present invention;

FIG. 6 is a table showing an example of a data structure of a machine information database according to the first embodiment of the present invention;

FIG. 9A is a diagram showing an example of an available service list screen of service utilizing screens according to the first embodiment of the present invention and FIG. 9B is a diagram showing an example of a selected service explanation screen of the service utilizing screens according to the first embodiment of the present invention;

FIG. 14A is a diagram showing another example of a service type list of the service utilizing screens according to the first embodiment of the present invention and FIG. 14B is a diagram showing an each type available service list screen of the service utilizing screens according to the first embodiment of the present invention;

FIG. 15 is a diagram for explaining services according to a second embodiment of the present invention;

FIG. 17 is a table showing an example of a data structure of a counter information database according to the third embodiment of the present invention; and FIG. 18 is a table showing an example of a data structure of a user information database according to the third embodiment of the present invention.

DETAILED DESCRIPTION OF THE PREFERRED EMBODIMENTS

[Features of the Present Invention]

Figure 1:
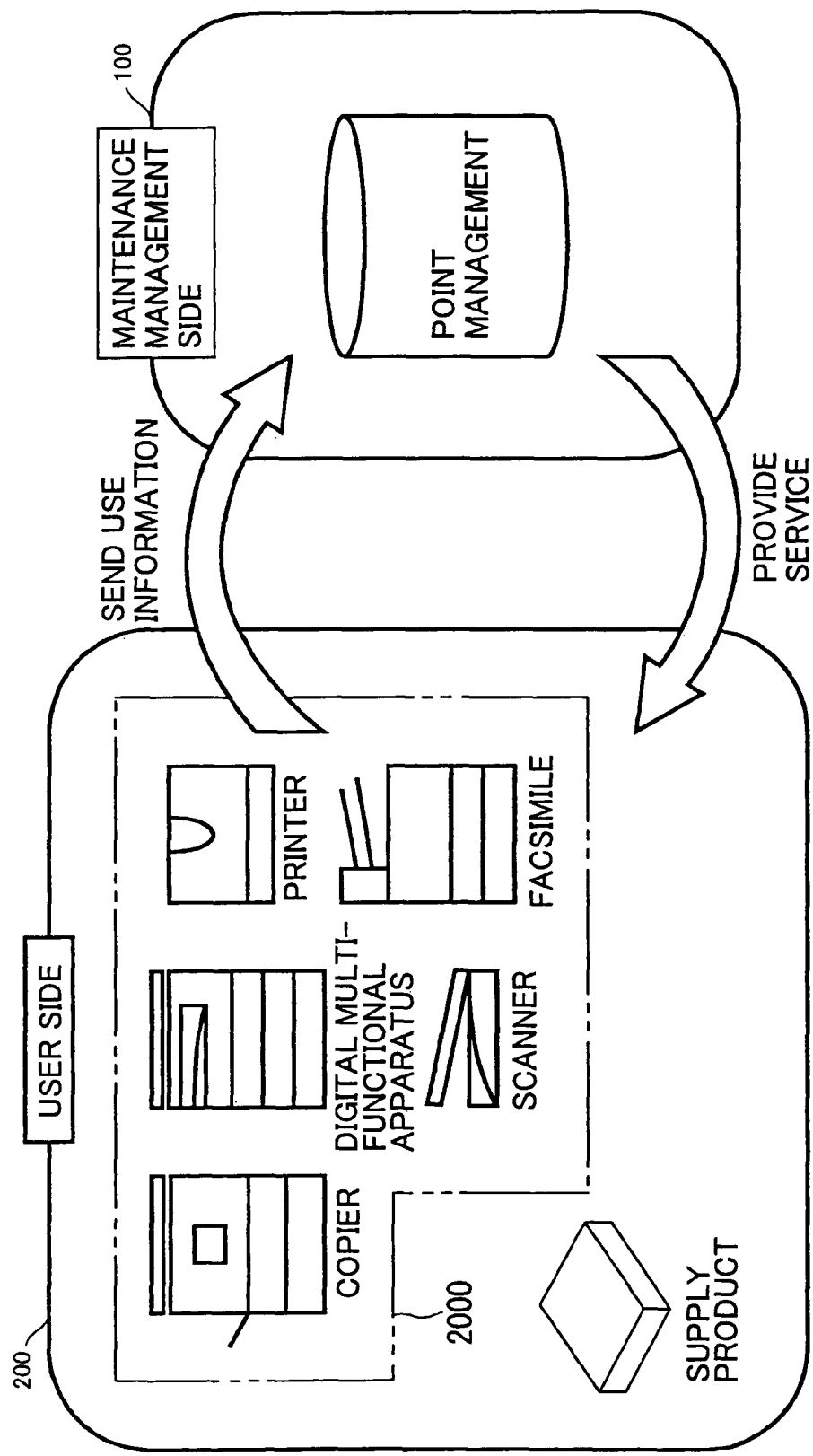
FIG. 1 is a diagram for explaining services according to a first embodiment of the present invention.

Features of the present invention will be described prior to a detailed explanation of the present invention.

The present invention is to manage a utilization number of each of the machines (function) installed at a user side at a maintenance management side of a maker of machines such as a copier, a printer, a scanner, a facsimile, and a digital multi-functional apparatus or an MFP (Multi-Function Printer) mounting these functions, and provide a suitable service for the usage number.

The usage number shows how many times the user printed out, sent or received by facsimile, or scanned, by using a copy function as a copier, a print function as a printer, a facsimile function as a facsimile, and a scan function as a scanner. It is preferable to count the paper sheets. In a case of the scanner, one set of image data obtained by scanning is calculated as one paper sheet. In a case of the facsimile, the number of paper sheets sent or received is calculated. Furthermore, in the present invention, these usage numbers are converted into points by predetermined parameters (parameters provided for copying, printing, scanning, sending and receiving by facsimile, respectively) and maintained at the maintenance management side.

Moreover, in the present invention, in addition to the usage numbers described above, the point value is calculated depending on purchases and utilizations when the user purchases or utilizes a supply product provided by the maintenance management side, and a machine is maintained. The supply product will be described later.

Furthermore, as services provided in the present invention, preferably, a discount of a maintenance management charge or free maintenance management, an article of consumption, such as paper sheets and toner, or a like (free service or charged service: in a case of a charged service, a discount is given), a free or charged maintenance such as a repair, a replacement, and a like (in a case of a charged maintenance, a discount is given), and a free or charged maintenance service or machine check service (in a case of a charged maintenance service or check service, a discount is given) are provided.

Moreover, the present invention has the following features other than the features as described above.

First, the present invention has a feature in that various services described above can be utilized through a display provided in the digital multi-functional apparatus including any one of a copier, a printer, a scanner, a facsimile, and functions thereof. That is to say, in the present invention, a service utilizing screen is displayed at the display based on a point value managed at the maintenance management side and provided to each user. The user utilizes the service based on the service utilizing screen displayed at the display.

In addition, the present invention has a feature in that the service utilizing screen can be displayed at a monitor of a personal computer (hereinafter called PC) as well as the machines (the copier, the printer, the facsimile, the digital multi-functional apparatus, and a like). Thereby, it is possible for the user to utilize the service not only from any one of the machines but also from any terminal.

Furthermore, the present invention has a feature in that the point value managed at the maintenance management side can be confirmed at each display of the machines or the monitor of the PC. Thereby, in the present invention, the user can confirm how many points the user has obtained. Accordingly, it is possible to promote the greater use of the machines to the user.

Preferred embodiments of the present invention having features as described above will be described with reference to the figures.

First Embodiment

A first embodiment of the present invention will be described as follows:

In the first embodiment, as shown in FIG. 1, information concerning utilization (usage information or counter information) of a digital multi-functional apparatus or an MFP (Multi-Function Printer: hereinafter, included in the digital multi-functional apparatus) is sent to the maintenance management side 100. And the maintenance management side 100 maintains and manages the information. Moreover, a point value corresponding to a purchase or utilization of a supply product is added.

In a case that accumulative point value reaches a predetermined point count, the maintenance management side 100 proposes specific services to the user and provides the user one service selected from the specific services.

An example of a configuration that specifically realizes the features of the first embodiment shown in FIG. 1 will be described with reference to FIG. 2.

Configuration of the First Embodiment

Figure 2:
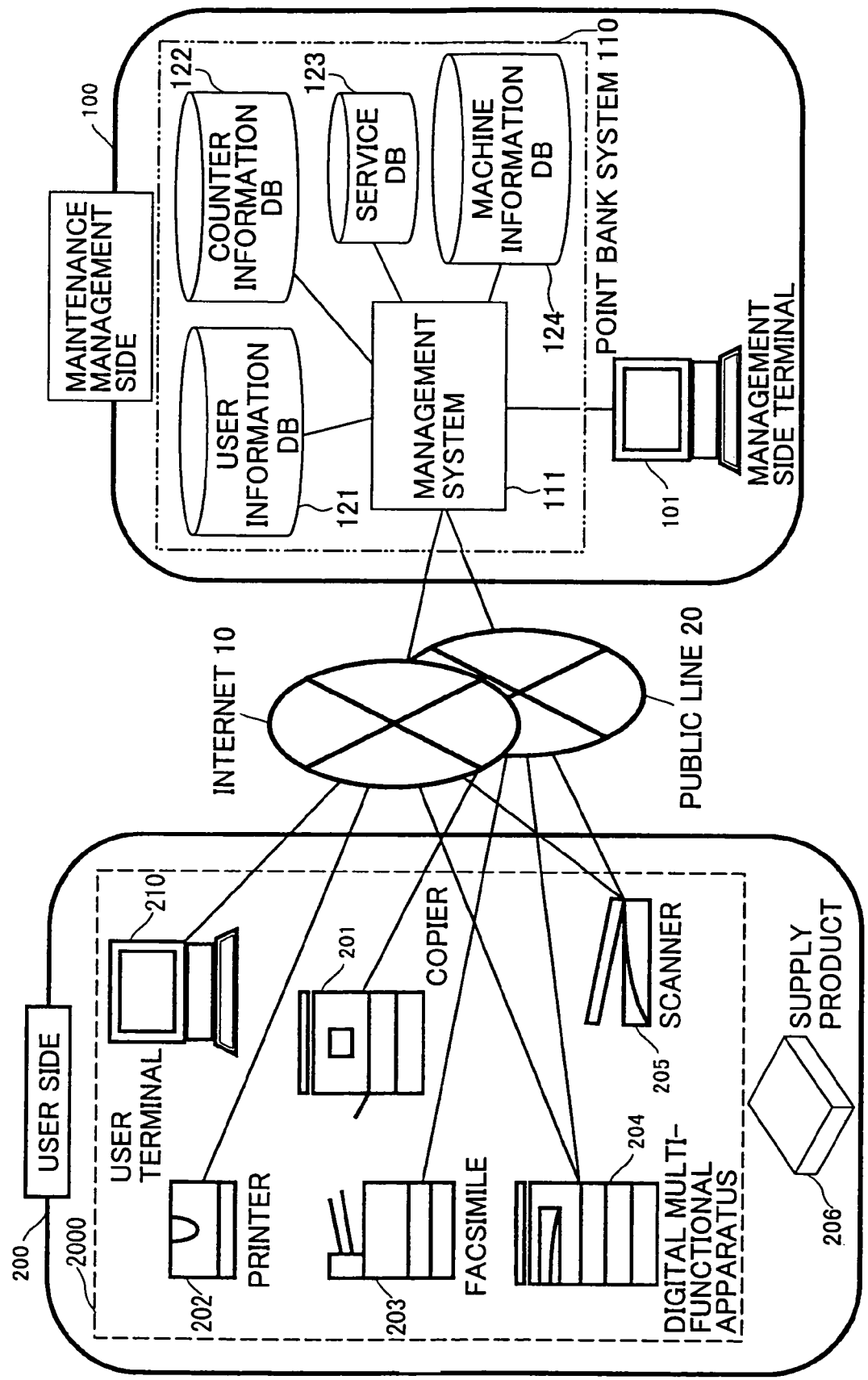
FIG. 2 is a block diagram showing an example of a system configuration according to the first embodiment of the present invention.

Referring to FIG. 2, the maintenance management side 100 and the user side 200 are shown in the first embodiment. The maintenance management side 100 provides machines 2000 including a copier 201, a printer 202, a facsimile 203, a digital multi-functional apparatus (including the MFP) 204, and a scanner 205, to the user side 200. At the user side 200, at least one of the machines 2000 is utilized and the maintenance management service is conducted thereto. In this case, the maintenance management side 100 can be a manufacturer of the machines 2000. A user at the user side 200 can be an individual or a corporation.

A supply product 206 is a product provided for the copier 201, the printer 202, the facsimile 203, the digital multi-functional apparatus 204, the scanner 205, and a like. For example, the supply product 206 can be an article of consumption or various parts for toner, a paper sheet, or a like, or various support services for a maintenance check, a repair, or a like. The supply product 206 is not limited to these but various products and services can be applied as the supply product 206.

Maintenance Management Side 100

In a system configuration according to the first embodiment as shown in FIG. 2, the maintenance management side 100 includes a point bank system 110 and a management side terminal 101.

The point bank system 110 is a system to manage utilization information sent from the user side 200 via a network (the Internet 10, the public line 20, or a like) and provide a service according to the first embodiment to the user side 200.

The point bank system 110 shown in FIG. 2 includes a management system 111, a user information database (DB) 121, a counter information database 122, a service database 123, and a machine information database 124.

In this configuration, the user information database 121 stores necessary information concerning the user who has concluded a predetermined contract with the maintenance management side 100. The counter information database 122 stores and manages counter information (utilization information) sent from the machines 2000 provided at the user side 200. The service database 123 maintains all candidate services to provide to the user side 200. Moreover, the machine information database 124 stores machine information and connection information (including a telephone number and information necessary to communicate using an IP address or a like) of the machines 2000 specified by machine IDs included in the machine ID group of the user information database 121. These databases 121, 122, 123 and 124 will be described later.

Also, the management side terminal 101 is a terminal for staff at the maintenance management side 100 to input various settings and information, and is connected to the management system 111 through a network such as a LAN (Local Area Network).

User Side 200

Moreover, in FIG. 2, the copier 201, the printer 202, the facsimile 203, the digital multi-functional apparatus 204, the scanner 205, and a like are provided at the user side 200. In the first embodiment, not all machines 2000 are necessarily provided at the user side 200 but at least one of the machines 2000 is provided, that is any one of machine types of the machine 2000. For the sake of convenience, the machines 2000 include all machine types and one for each machine type.

Moreover, the machines 2000 provided at the user side 200 are connected to the point bank system 110 at the maintenance management side 100 via the network (the Internet 10, the public line 20, or a like).

Furthermore, a user terminal 210 configured by such as a PC or a like is provided at the user side 200 and is connected to the point bank system 110 through the Internet 10, the public line 20, or a like.

In this configuration, identification information is uniquely assigned to each of the copier 201, the printer 202, the facsimile 203, the digital multi-functional apparatus 204, and the scanner 205, and is stored in an internal memory thereof. A manufacturer's number can be applied as the identification information, hereinafter called a machine ID.

In addition, each of the copier 201, the printer 202, the facsimile 203, the digital multi-functional apparatus 204, and the scanner 205 mounts a counter that counts a utilization number (the number of paper sheets) each time a job is executed for each job type (for example, a copy job if the copier 201, a print job if the printer 202, a facsimile send/receive job if the facsimile 203, any one of these jobs if the digital multi-functional apparatus 204, and a scan job if the scanner 205). Hereinafter, information identifying the job type is called a job ID.

Furthermore, each of the copier 201, the printer 202, the facsimile 203, the digital multi-functional apparatus 204, and the scanner 205 sends a value as counted above (hereinafter, called a counter value) to the management system 111 with the machine ID and the job ID through the network (the Internet 10, the public line 20, or a like).

In this case, each of the copier 201, the printer 202, the facsimile 203, the digital multi-functional apparatus 204, and the scanner 205 temporarily maintains the counter value in an internal or external storage device thereof and then, may send the counter value with the machine ID or may send the counter value with the machine ID each time a job is executed. Also, information of a date and time when each job is executed may be additionally included in information to be sent to the management system 111.

In this configuration, the counter internally mounted in each of the machines 2000 is a software counter (counter recording the counter value as electronic data). Alternatively, for example, the counter can be a mechanical counter (counter physically recording the counter value). In this case, the counter value can be sent to the point bank system 110 through the network. Alternatively, the staff may be sent from the maintenance management side 100 to the user side 200 periodically or as necessary, may detect the counter value of each counter of the machines 2000, and may input the counter of each counter from the management side terminal 101 at the maintenance management side 100 to the counter information database 122.

Moreover, the management system 111 in the point bank system 110 calculates the point value for each user by referring to the counter value, the job ID of each count information, and each user information stored as described above, and stores these to respective items of the user information database 121.

Furthermore, in the first embodiment, in a case in which the supply product 206 provided by the maintenance management side 100 is purchased and utilized at the user side 200, the point value corresponding to the supply product 206 is input from the management side terminal 101 to the point bank system 110. It should be noted that the point value corresponding to the supply product 206 is defined at the maintenance management side 100 beforehand.

Moreover, in the first embodiment, the point value can be viewed using the user terminal 210. Thus, in the first embodiment, a user ID and a password are defined for each user. The user accesses the point bank system 110 using the user ID and the password. After authenticating the user by using the user ID and the password, the point bank system 110 sends information including the point value of the user, in response to a user request, from the management system 111 to the user terminal 210 through the Internet 10. At the user terminal 210, the information including the point value is received by an application such as a browser or a like and is displayed to the user.

The point value managed at the point bank system 110 can be confirmed by the machines 2000 (the copier 201, the printer 202, the facsimile 203, the digital multi-functional apparatus 204, and the scanner 205) at the user side 200. This can be realized by embodying an application for displaying the point value sent from the point bank system 110 in the machines beforehand. In addition, communication from the point bank system 110 to each of the machines 2000 can be conducted in accordance with a predetermined protocol through the network (the Internet 10, the public line 20, or a like).

Moreover, each of the machines 2000 at the user side 200 is configured so that the count value of each of the machines 2000 can be displayed at a display (LCD (Liquid Crystal Display), touch panel, or a like). The counter value to be displayed may be an accumulative counter value or a counter value for every predetermined period. The counter value may be displayed for each job type.

Furthermore, in the first embodiment, utilization of the supply product can be a subject for which to add points. In this case, for example, based on contents ordered from the user terminal 210 or each of the machines 2000 to the management system 111, the point value may be calculated and added at the management system 111. Alternatively, based on contents ordered by phone, the staff at the maintenance management side 100 may input the point value using the management side terminal 101.

(Database Configuration)

Next, a configuration of each of databases 121, 122, 123, and 124 will be described with reference to figures in detail, according to the first embodiment of the present invention.

User Information Database 121

First, a data configuration of the user information database 121 will be described with reference to FIG. 3, according to the first embodiment.

Referring to FIG. 3, the user information database 121 according to the first embodiment includes as items a user ID, a password, a name (contact person if the user is from a corporation or a section of the corporation), an address (address of the corporation of the user or the section of the corporation), a telephone number (telephone number of the contact person if the user is from a corporation or a section of the corporation), an e-mail address (e-mail address of the contact person if the user is from a corporation or a section of the corporation), a machine ID group (machine IDs of all machines 2000 provided from the maintenance management side 100), contract contents concluded between the user side 200 and the maintenance management side 100, payment information necessary for the maintenance management side 100 to collect the maintenance management charge and other charges from the user side 200, and a point value accumulated for each user (point information: preferably, detailed information is included for each job type).

The user ID and the password are given from the maintenance management side 100 to the user side 200 when the user side 200 concludes the contract for utilizing services according to the first embodiment with the maintenance management side 100. In addition, the name, the address, the telephone number, the e-mail address, the machine ID group, the contract contents, and the payment information are sent from the user side 200 when the user at the user side 200 applies to utilize the services to the maintenance management side 100. The maintenance management side 100 may maintain the machine IDs provided to the user side 200 for the machines 2000 beforehand, and the machine ID group may store the machine IDs.

Counter Information Database 122

Next, a data configuration of the counter information database 122 according to the first embodiment will be described with reference to FIG. 4.

Referring to FIG. 4, items of the machine ID, the counter value, the job type, and job executed date and time are stored in the counter information database 122 according to the first embodiment.

The counter value is a value counted by the software counter or the mechanical counter provided in each of the machines 2000 (or job types), and may be an entirely accumulated value or a periodically accumulated value.

Also, these items are sent from each of the machines 2000 at the user side 200 through the network (the Internet 10, the public line 20, or a like).

Service Database 123

A data configuration of the service database 123 according to the first embodiment will be described with reference to FIG. 5.

Referring to FIG. 5, the service database 123 according to the first embodiment includes items of a service ID identifying a service, a point value (required point value) required (deducted) to utilize the service, a comment (service explanation) for explaining a service name or service contents, and information (service information) to realize an operation for actually providing the service. The service information may be about software if the service is provided by the software, software for causing a system calculating the maintenance management charge to conduct a request or an operation if, for example, the service is to discount the maintenance management charge, or software for making an order if the service is to provide the supply product 206 free or with a charge. In addition, an example of the service to be provided will be described in detail later.

Machine Information Database 124

A data configuration of the machine information database 124 according to the first embodiment will be described with reference to FIG. 6.

Referring to FIG. 6, the machine information database 124 according to the first embodiment stores information necessary when the management system 111 establishes a line with each of the machines 2000 provided at the user side 200. Accordingly, the machine information database 124 stores the machine ID and machine information and connection information corresponding to the machine ID. The machine information includes information of year, month, and date of manufacture for each of the machines 2000. The connection information is information necessary to establish a connection with the management system 111 through the network (the Internet 10, the public line 20, or a like).

By the data configuration described above, in the first embodiment, based on the utilization number of each of the machines 2000 provided to the user side 200, various services can be suitably provided for each user.

It should be noted that the data configurations of the databases 121, 122, 123, and 124 are not limited as described above, but any modified data configuration storing necessary information can be applied.

Operations of the First Embodiment

Next, steps to provide the service by using such as the system configured above will be described with reference to figures in detail, according to the first embodiment.

The operation according to the first embodiment of the present invention mainly consists of the following five steps:
(1) user registering step
(2) counter information collecting step
(3) point accumulating step
(4) service utilizing screen providing step
(5) service providing step The user registering step (1) is a step in which the user side 200 concludes or modifies a contract in order to utilize a service (hereinafter, this service is called a point bank service). An operation may be conducted for creating a new record concerning the user who contracts regarding the user information database 121 in FIG. 2 or another operation may be conducted for modifying the contents already registered.

In addition, the counter information collecting step (2) is a step that collects the counter information from the machine 2000 provided in user side 200 and maintains the counter information at the maintenance management side 100. Moreover, in the counter information collecting step (2), an operation is conducted to obtain the counter information via the network (the Internet 10, the public line 20, or a like), or another operation is conducted to input the counter value and a like (including the machine ID, other information, and a like) calculated by a service staff member from the management side terminal 101.

In addition, the point accumulating step (3) is a step for accumulating the point value for each user. In the point accumulating step (3), based on the counter information collected and input in the counter information collecting step (2), an operation is conducted to calculate the points accumulated until the present time.

In addition, the service utilizing screen providing step (4) is a step for providing a screen for utilizing the point bank service 110 according to the first embodiment, to the user side 200. In the service utilizing screen providing step (4), an operation is conducted to send the screen for utilizing various services to the machine 2000 of the user side 200 via the network (the Internet 10, the public line 20, or a like).

In addition, the service providing step (5) is a step for the user to utilize the service based on the screen provided in the service utilizing screen providing step (4) or the service providing screen example shown to the user terminal 210. In the service providing step (5), an operation is conducted to provide the screen corresponding to each service. That is, the services in the first embodiment are for providing software or hardware (supply product or a like). Accordingly, in the service providing step (5), an operation corresponding to each service is conducted. Each operation in steps (1) through (5) described above will be described.

*(1) User Registering Step

First, in the user registering step (1) according to the first embodiment, an operation is conducted to register various information concerning the user who applies to utilize a service provided in the first embodiment, to the user information database 121.

**Case of a New Contract

When at the user side 200 a new copier, a new printer, a new facsimile, a new digital multi-functional apparatus, a new scanner or a like (hereinafter, called machines 2000) is leased or purchased and the user contracts to utilize the point bank system 110, each item stored in the user information database 121 according to the first embodiment is input by the staff from the management side terminal 101 to the maintenance management side 100. It should be noted that in this case, the information to be input is input based on information that the user provided in a proper application sheet or a sheet for a lease or a purchase contract.

**Case of Contract Changes

In addition, when the user at the user side 200 additionally purchases a new machine 2000 or the user replaces or cancels the machine 2000, then the current contract is changed and, and based on the contract change, the staff at the maintenance management side 100 changes registered items of the contents by using the management side terminal 101. In addition, when the user side 200 moves to a new address or a contact person is changed, a similar operation is conducted.

However, since the purpose of the user registering step (1) is to store information needed for the user information database 121, as long as this purpose can be achieved, it is possible to modify variously and to carry out the user registering step (1).

*(2) Counter Information Collecting Step

In addition, in the counter information collecting step (2) according to the first embodiment, the operation is conducted to collect the counter information of each job at the machines 2000 provided at the user side 200 and store the counter information to the counter information database 122. As for the operation to collect the counter information, a method for collecting via the network (the Internet 10, the public line 20, or a like) or a method in that the staff at the maintenance management side 100 comes to the user side 200, determines the counter information, and inputs from the management side terminal 101 to the point bank system 110 can be applied to the first embodiment.

**Case of Collecting Via the Network

When the counter information of each machine 2000 provided at the user side 200 is collected via the network (the Internet 10, the public line 20, or a like), in each machine 2000, the counter information concerning each job can be stored in an internal or an external storage unit. Accordingly, in this step, the management system 111 collects the counter information stored in such a storage unit periodically or every predetermined time, and then the operation for storing the counter information to the counter information database 122 is conducted.

The operation to output the counter information from each machine 2000 at the user side 200 to the point bank system 110 can be conducted from each machine 2000 or the management system 111.

The timing of starting the operation in each machine 2000 can be a time when a predetermined period passes after the last transmission or at a predetermined time, by using a time mechanism inside the machine 2000. Moreover, as for the timing given from the management system 111 to start the operation, by using the time mechanism in the management system 111, it is determined when the predetermined period passes after the last transmission, when the predetermined time arrives, or when an instruction to start an operation is input from the management side terminal 101. Then, the operation is started.

An example of the operation for collecting the counter information in a case in which the timing of the operation start is given by the management system 111 will be described with reference to FIG. 7. In the first embodiment, the predetermined time is detected by the management system 111 and then the operation is started.

Figure 7:
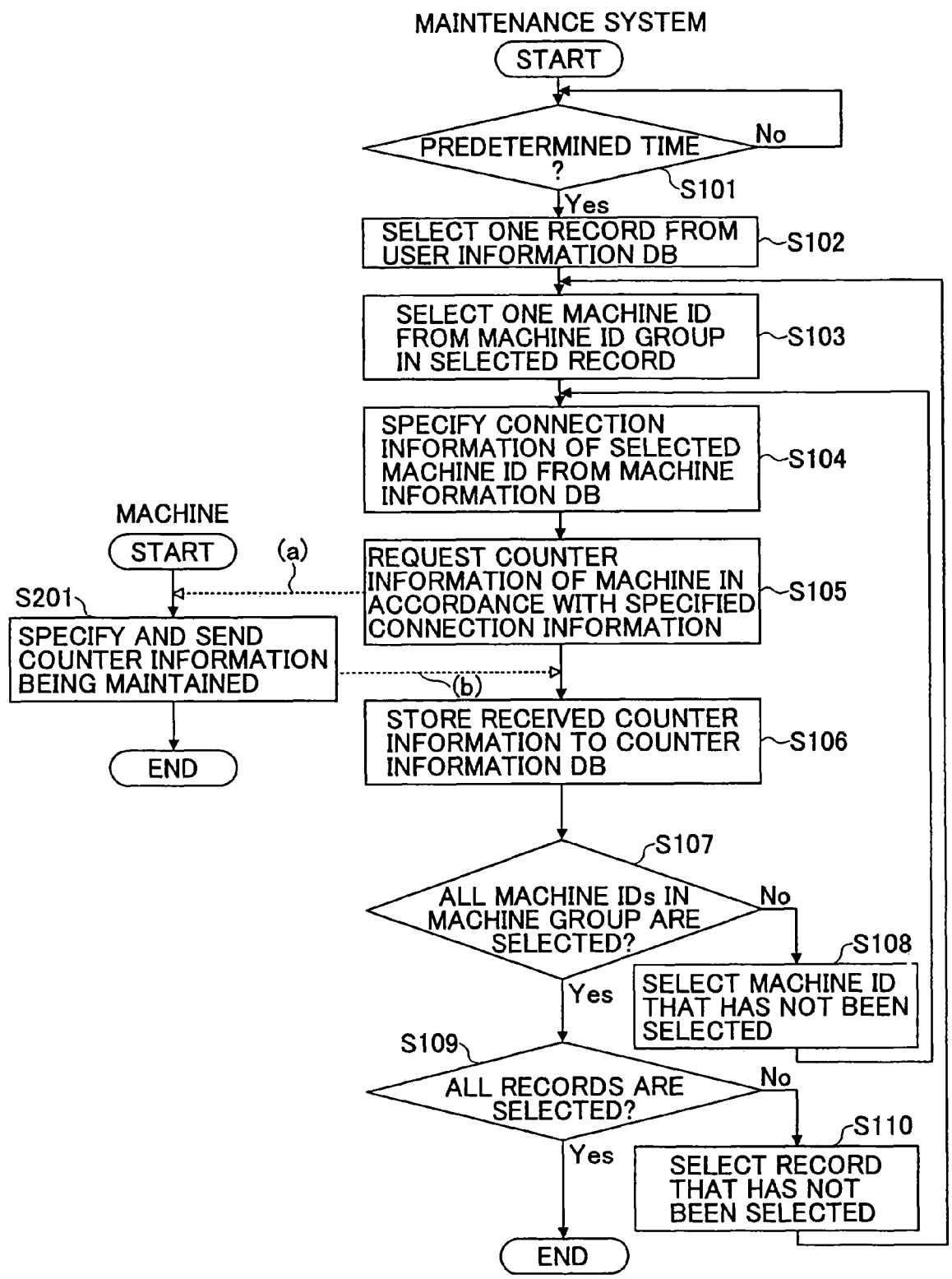
FIG. 7 is a flowchart for explaining an example of an operation conducted in a counter information collecting step according to the first embodiment of the present invention.

Referring to FIG. 7, in the first embodiment, the management system 111 always monitors time based on the time mechanism provided inside the management system 111 (step S101). When the time arrives at the predetermined time (Yes in step S101), the management system 111 refers to the user information database 121 and selects one record (step S102). In addition, the predetermined time set in the management system 111 can be in a time frame in which the network (the Internet 10, the public line 20, or a like) is not experiencing heavy use.

Next, the management system 111 specifies the machine ID group in the record selected in step S102, and selects one from the machine ID group (step S103).

Moreover, the management system 111 specifies connection information corresponding to the machine ID selected in step S103 (step S104), establishes a line connection with the machine 2000 that is the target machine in accordance with the connection information, and requests the machine 2000 to send the counter information (a) (step S105). When the machine 2000 receives the request for the counter information, the machine 2000 specifies the counter information stored a storage unit (hard disk or a like) that is internally or externally provided, and sends the counter information (b) to the management system 111 via the network (the Internet 10, the public line 20, or a like) (step S201). The counter information sent to the management system 111 includes information corresponding to items which are to be stored in the counter information database 122 shown in FIG. 4. However, the machine ID does not need to be stored because the machine ID can be specified by the management system 111.

As a result of the operation, it is needed to manage not to duplicate the same counter information in the point bank system 110. As a method for realizing this, the management system 111 may indicate a period and request the counter information of each machine 2000, each machine 2000 may delete the counter information that has already been sent, or identification may be provided to the counter information to show that the counter information has already sent. However, the method is not limited to do so, but various modifications can be applied to the configuration in the first embodiment in order that the point bank system 111 not manage duplicated counter information.

By the operation described above, the management system 111, which receives the counter information, stores the counter information corresponding to the machine ID into the counter information database 122 (step S106).

After that, in step S107, the management system 111 determines whether or not all machine IDs included in the machine ID group specified in step S103 are selected. That is, the management system 111 determines whether or not the counter information is collected from all machines 2000 corresponding to the machine IDs included in the machine ID group. When it is determined that not all counter information is collected (No of step S107), a machine ID that has not selected is selected (step S108), and then the operation goes back to step S104.

In addition, as a result of step S107, when it is determined that all machine IDs are selected (Yes of step S107), the management system 111 determines whether or not all records registered in the user information database 121 are selected. That is, it is determined whether or not the counter information is collected from all user sides 200 registered in the user information database 121 as users utilizing services (step S109). When it is determined that the counter information is not collected from all user sides 200 (No of step S109), a record that has not been selected is selected (step S110), and then the operation goes back to step S103.

Also, as a result of step S109, when it is determined that all records are selected (Yes of step S109), the management system 111 terminates the operation.

In the operation described above, the management system 111 may skip steps for the machines 2000 when the management system 111 cannot establish a line connection with the machines 2000.

Also, in the operation described above, for example, an algorithm for selecting one record or one machine ID can be a round-robin method.

**Case of Collecting by Staff

Different from the method of using the network, the staff of the maintenance management side 100 comes to the user side 100, reads the counter information (counter value) stored in a counter of each machine 2000, and stores the counter information to the counter information database 122. In this case, the staff of the maintenance management side 100 accesses the point bank system 110 using the management side terminal 101, inputs the counter information by indicating the machine ID and a job ID, and stores the counter information to the counter information database 122.

By operating as described above, it is possible to collect the counter information of all the machines 2000 registered to the users provided at the user sides 200, and to store the counter information to the counter information database 122.

(3) Point Accumulating Step

In the point accumulating step (3) according to the first embodiment, based on the counter information collected in the counter information collecting step (2), the points for each user are calculated, and are added to a point value (called a point balance) included in the point information stored in the user information database 121.

It can be configured that this operation is initiated by a trigger such as an end of an operation shown in FIG. 7. Alternatively, it can be configured that this operation is initiated based on an instruction input from the management side terminal 101 or a like.

Figure 8:
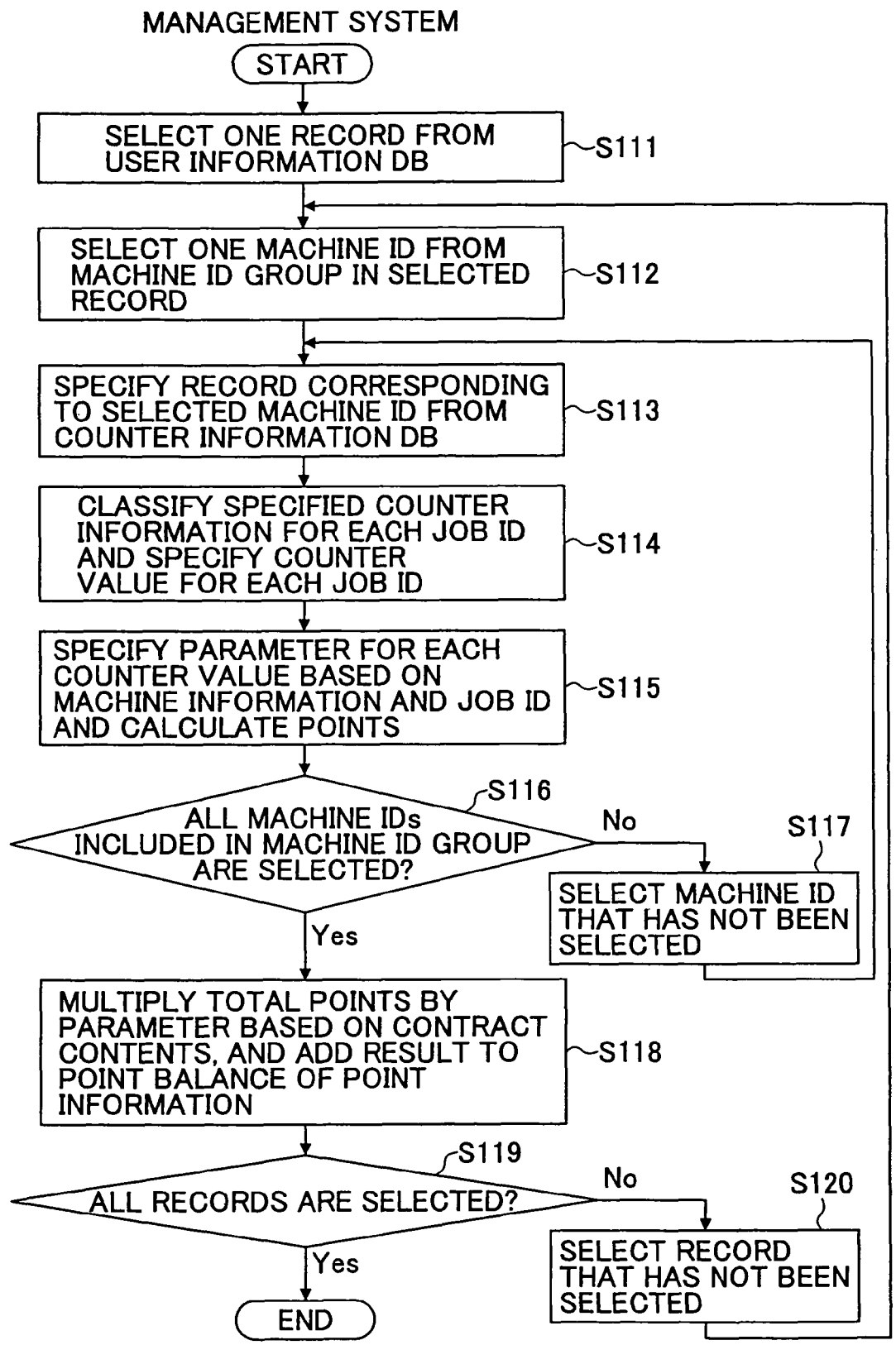
FIG. 8 is a flowchart for explaining an example of an operation conducted in a point accumulating step according to the first embodiment of the present invention.

An example of this operation will be described with reference to FIG. 8. Referring to FIG. 8, in this operation, the management system 111 selects one of records of the user information database 121 (step S111), and selects one machine ID from the machine ID group in the record selected in step S111 (step S122). As a selecting method in steps S111 and S112, similar to the selecting method in FIG. 7, for example, a round-robin method can be conducted.

When selecting one machine ID, the management system 111 specifies a record (the counter information including the count value and the job ID) from the counter information database 122 by using the machine ID (step S113). Then, a specified record is classified for each job ID and the counter value for each job ID is specified (step S114). However, in step S114, the classification operation for classifying the counter information for each job ID can be omitted if a subject machine 2000 is not a digital multi-functional apparatus providing a plurality of functions (more than one of the copy function, the print function, the facsimile function, and a like). In addition, the counter information that is not previously used for a point calculation is the subject information in this operation. Thus, it is possible for the operation to prevent duplicating the same counter information. Alternatively, as a method for preventing duplicate counter information, the counter information (record) once used to calculate the point value is deleted and moved to another database.

Next, based on the machine information and the job ID corresponding to the machine ID selected in step S112, a parameter is specified for each job ID and the point value is calculated for each machine 2000 by using the parameter and the count value (step S115). It is configured in that the point value for each machine 2000 is calculated based on the machine information and the job ID so as to change the parameter used based on contents of items. This configuration will be described later.

Moreover, the management system 111 determines in step S116 whether or not all machine IDs included in the machine ID group are selected, so as to calculate the point value for each of all machine IDs included in the machine ID group in the record selected in step S111. As a result of step S116, when it is determined that there are some machine IDs that have not been selected yet (No of step S116), the management system 111 selects one of the machine IDs that have not been selected yet, and then goes back to step S113.

Furthermore, as a result of step S116, when it is determined that all machine IDs are selected (Yes of step S116), the machine system 111 determines a predetermined parameter based on the contract indicated in the record selected in step S111. And the management system 111 multiplies total value of the points calculated in step S112 through step S117 by the predetermined parameter, and adds the multiplication result to the point value included in an item of the point information in the record selected in step S111 (step S118).

After that, the management system 111 determines in step S119 whether or not all records registered in the user information database 121 are selected, that is, whether or not the point value is calculated based on the counter information newly stored for all users. When it is determined that there are records that have not been selected yet (No of step S119), the management system 111 selects one of the records that have not been selected yet (step S120) and then goes back to step S112. Also, as a result of step S119, when it is determined that all records are selected (Yes of step S119), the management system 111 terminates this process.

As described above, the point balance for each user can be updated based on the counter information newly stored.

Also, for example, an algorithm for selecting the record or the machine ID can be the round-robin method.

*(4) Service Utilizing Screen Providing Step

Next, the service utilizing screen providing step (4) will be described according to the first embodiment of the present invention.

The service utilizing screen providing step (4) provides a screen to utilize the service provided according to the first embodiment and to provide a list of service (a list of an explanation of service contents) that the user can utilize and information of the point value necessary to utilize the service.

**Example of Service Utilizing Screen

Service utilizing screens are illustrated in FIG. 9A and FIG. 9B, according to the first embodiment of the present invention. For example, the service utilizing screens are displayed at a display unit (including an LCD, a touch panel, and a like) of the machine 2000. A case in which the service utilizing screens are displayed at the display unit including the touch panel will be described.

Referring to FIG. 9A and FIG. 9B, as service utilizing screens according to the first embodiment of the present invention, an available service list screen in FIG. 9A and a selected service explanation screen in FIG. 9B are provided.

***Available Service List Screen

The available service list screen illustrated in FIG. 9A shows the point balance of the user, a service list (available service list) available for the current point balance, and a point value needed (to be deducted) when each service listed in the available service list is utilized.

Moreover, if the available service list screen includes a plurality of pages, it is preferable to provide a current page number and buttons to move to the next page or the previous page in the available service list screen.

When the user selects one of the services listed in the available service list screen and clicks the button "SELECT", the selected service explanation screen illustrated in FIG. 9B is displayed at the display unit of the machine 2000.

In the available service list screen, each service listed in the available service list screen corresponds to a service ID.

**Selected Service Explanation Screen

The selected service explanation screen is a screen to explain contents of the service selected by the user in detail and provides a section for explaining the contents of the service. In addition, in the selected service utilizing screen, it is preferable to display the point balance after utilizing the service selected by the user.

When a button "UTILIZE SERVICE" is clicked by the user in the selected service explanation screen, an operation for providing the service is actually conducted. A detailed service example will be described later.

**Service Utilizing Screen Sending Operation

Next, an operation for sending the service utilizing screens illustrated above to the machine 2000 at the user side 200 will be described with reference to FIG. 10. It should be noted that this operation is initiated by a trigger indicating that the operation shown in FIG. 8 is completed.

Figure 10:
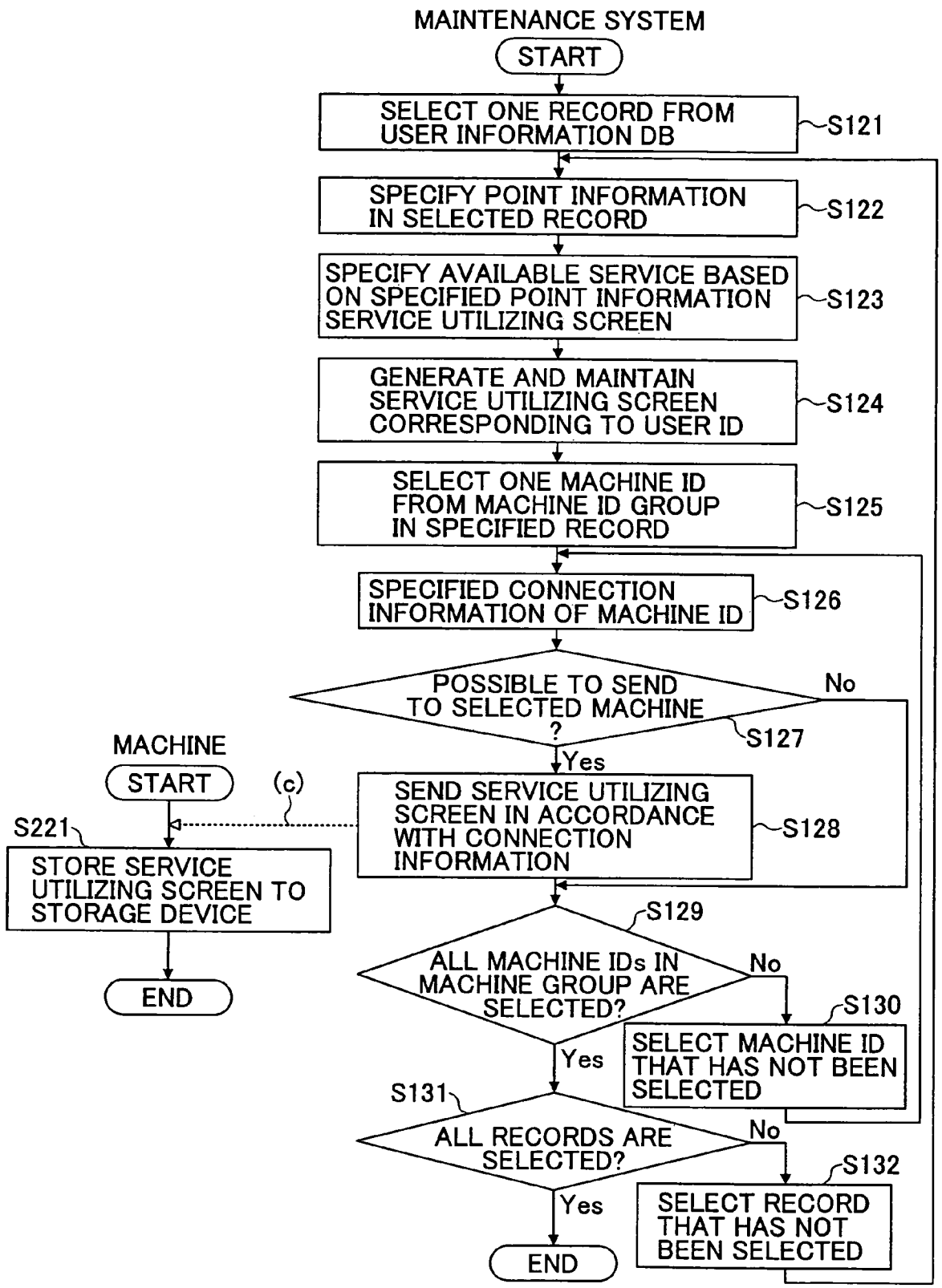
FIG. 10 is a flowchart showing an example of an operation conducted in a service utilizing screen providing step according to the first embodiment of the present invention.

Referring to FIG. 10, in this operation, the management system 111 selects one of the records registered in the user information database 121 (step S121).

Next, the management system 111 specifies the point information in the record selected in step S121 (step S122), and provides a service available from the service database 123 based on the point value (point balance) included in the point information specified in step S122 (step S123).

When the service available to be provided to the user is specified, the management system 111 creates the service utilizing screens described above based on the service specified above, and maintains the service utilizing screens by corresponding to the user ID (step S124). The service utilizing screens created by the management system 111 may be stored in the user information database 121 or another database.

After that, the management system 111 selects one from the machine ID group in the record selected in step S121 (step S125), and specifies the connection information corresponding to the machine ID selected in step S125 (step S126). Since not all machines 2000 provided at the user side 200 can display the service utilizing screens, in the first embodiment, it is determined whether or not the subject machine 2000 can display the service utilizing screens (step S127). For this determination, information showing whether or not each machine 2000 can so display may be stored beforehand in one item of the machine information database 124, for example, an item of the connection information.

As a result of step S127, when it is determined that the subject machine 2000 can display the service utilizing screens (Yes of step S127), the management system 111 establishes a connection with the subject machine 2000 via the network (the Internet 10, the public line 20, or a like) based on the connection information specified in step S126, and sends the service utilizing screens (c) created in step S124 (step S128). And the subject machine at the user side 200 stores the service utilizing screens received from the management system 111 to the storage unit internally or externally provided to the subject machine (step S221).

In addition, as a result of the step S127, when it is determined that the subject machine can not display the service utilizing screen (No of step S127), the management system 111 does not send the service utilizing screen and goes to step S129.

Moreover, the management system 111 determines whether or not all machine IDs included in the machine ID group in the record selected in step S121 are selected (step S129). When it is determined that not all machine IDs are selected (No of step S129), the management system 111 selects one of the machine IDs that have not been selected (step S130) and goes back to step S126. Also, as a result of step S129, when it is determined that all machine IDs are selected (Yes of step S129), the management system 111 determines whether or not all records registered in the user information database 121 are selected (step S131).

As a result of step S131, when it is determined that there are records that have not been selected yet (No of step S131), the management system 111 selects one from the records that have not been selected yet (step S132), and goes back to step S122. Also, as a result of step S131, when it is determined that all records are selected (Yes of step S131), the management system 111 terminates this process.

It is preferable to configure the operation for sending the service utilizing screen shown in FIG. 10 similar to the operation shown in FIG. 7, so that the operation in FIG. 10 is conducted when the network is not experiencing heavy use. In addition, in the operation in FIG. 10, for example, an algorithm for selecting the record or the machine ID can be the round-robin method.

By the operation shown in FIG. 10, it is possible to provide the service utilizing screen to the machine 2000 at the user side 200 for the user.

*(5) Service Providing Step

Next, the service providing step (5) will be described according to the first embodiment.

**Case of Providing the Service Indicated Through the Machine

In the service providing step, an operation is conducted for the maintenance management side 100 to provide the service selected by the user using the service utilizing screens provided to the machine 2000 at the user side 200.

Figure 11A:
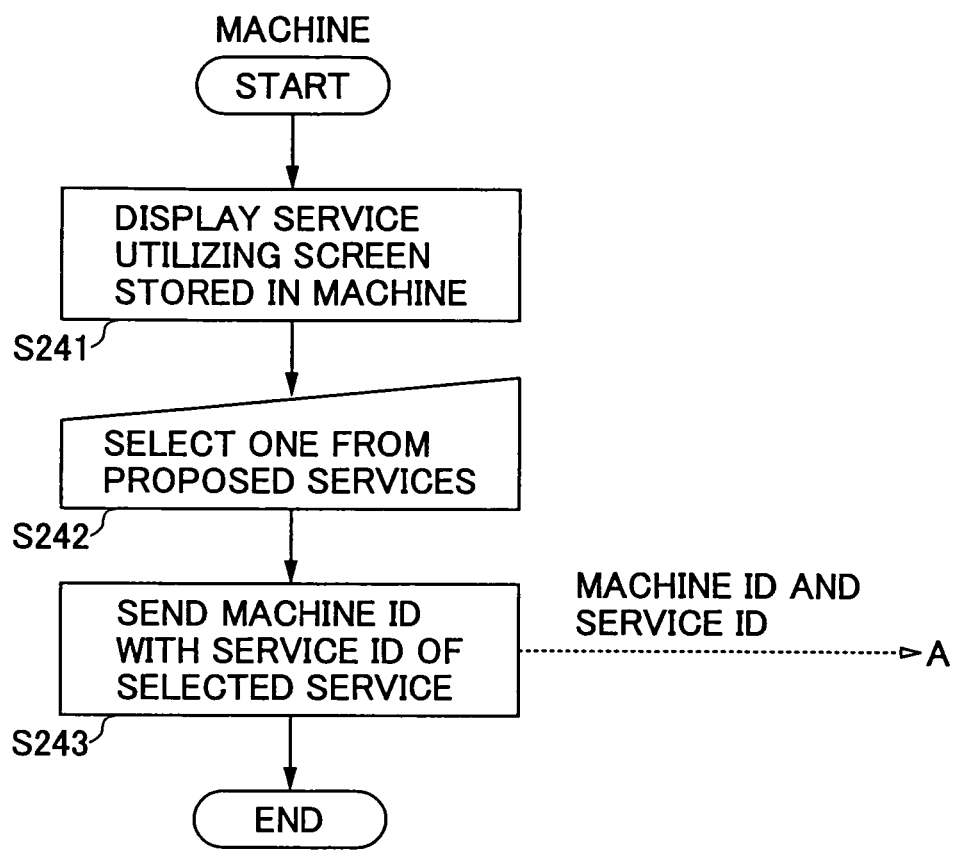
FIG. 11 is a flowchart showing an example of an operation conducted in a service providing step according to the first embodiment of the present invention, especially an example of an operation at a time of utilizing the service from a machine provided at a user side.
Figure 11B:
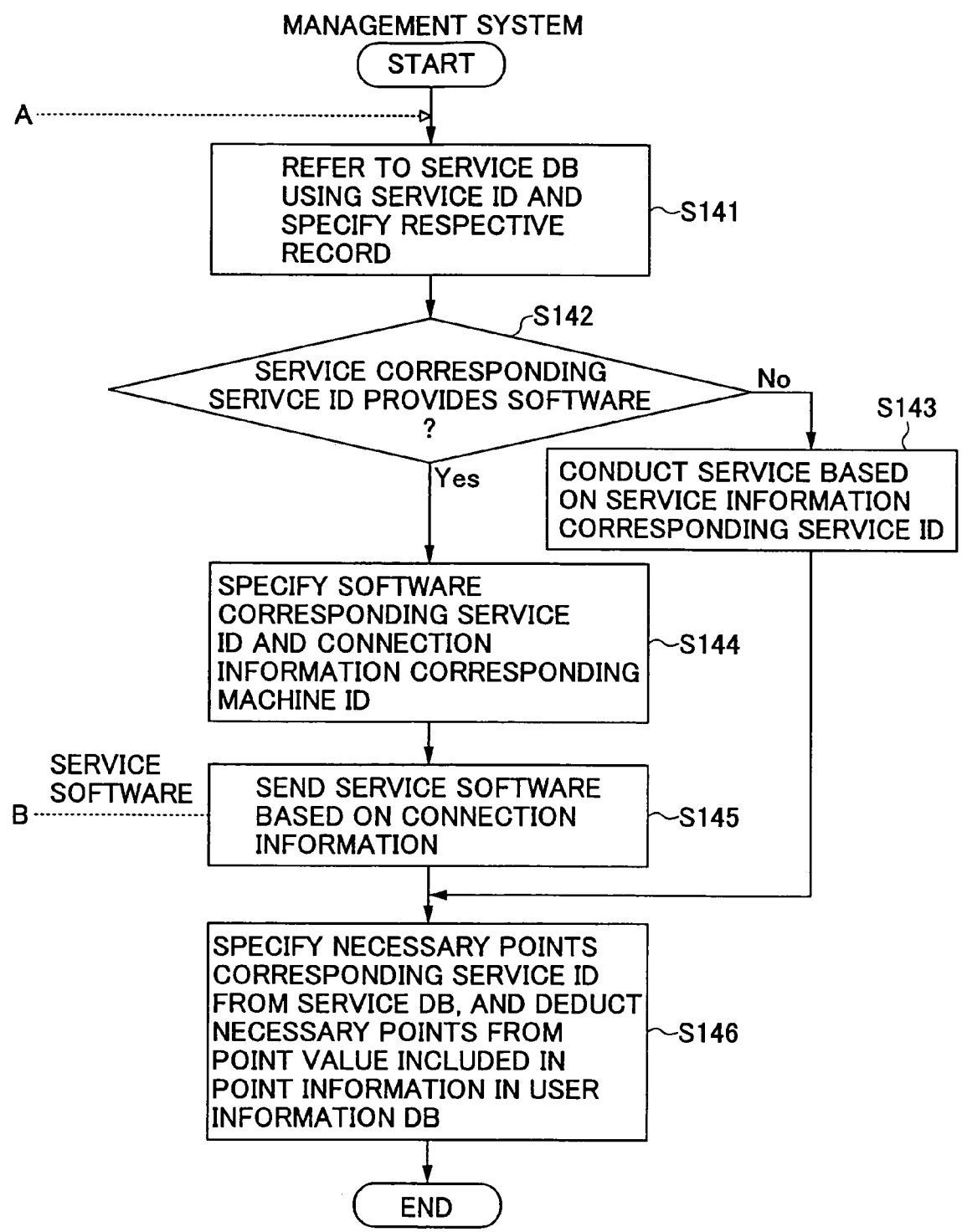
Figure 11C:
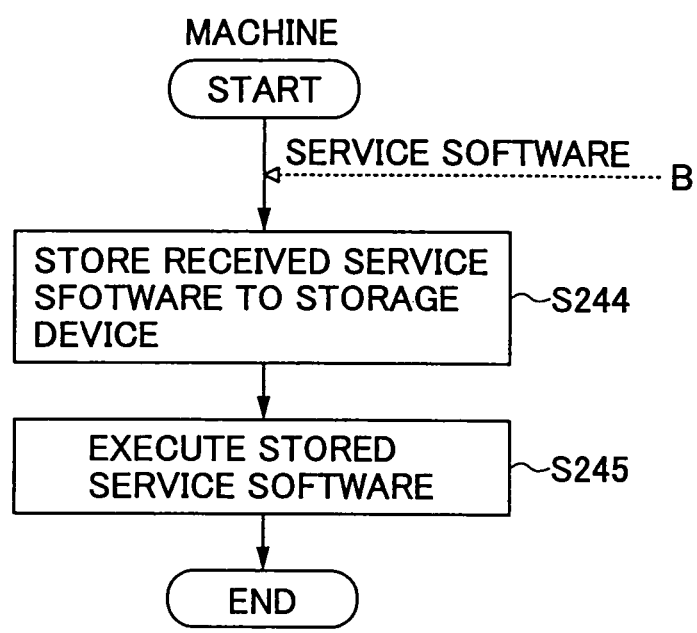

The operation is illustrated in FIG. 11. Referring to FIG. 11, in the first embodiment, the machine 2000 storing the service utilizing screens detects that the user approaches the machine 2000 or that the user presses a predetermined button, and then displays the service utilizing screens at the display unit or a like (step S241). In order to realize this, the machine 2000 is provided with means for detecting that a person or a like approaches the machine 200 and a button or a like to display the service utilizing screens at the display unit.

Moreover, when the user selects one service and inputs an instruction of a utilization decision (step S242) with respect to the service utilizing screens displayed at the display unit, the machine 2000 sends the service ID corresponding to the service selected by the user and the machine ID identifying the machine 2000 itself to the management system 111 through the network (the Internet 10, the public line 20, or a like) (step S243).

When the management system 111 receives the service ID and the machine ID, the management system 111 refers to the service database 123 using the service ID received from the machine 2000, and specifies the record corresponding to the service ID (step S141). After that, the management system 111 refers to the service information in the record specified in step S141 and determines whether or not the service information shows a service to provide software (hereinafter, called service software) (step S142).

As a result of step S142, when it is determined that the service software is to be provided (Yes of step S142), the management system 111 specifies the service software and the connection information corresponding to the machine ID received in step S141, and sends the subject machine 2000 the service software specified in step S144 in accordance with the connection information. When the machine 2000 receives the service software at the user side 200, the machine 2000 stores the service software in the storage unit internally or externally provided therewith (step S244) and executes the service software stored in the storage unit (step S245). Accordingly, the service selected by the user is provided to the user. On the other hand, as a result of step S142, when it is determined that the service software is not to be provided to the user (No of step S142), the management system 111 starts a process for providing the service to the user side 200 in accordance with the service information in the record specified above (step S143). The service to provide to the user will be described later.

After executing the process for providing the service, the management system 111 specifies the necessary point value in the record, and specifies the point information in the record corresponding to the machine ID from the user information database 121. The management system 111 deducts the necessary point value from the point value indicated by the point information specified above and updates the point value of the point information corresponding to the deduction result (step S146). Then, the management system 111 terminates the process.

Case of Providing the Service Indicated Through the User Terminal 210**

The method, in which the service utilizing screens are displayed at the machine 2000 at the user side 200 and the service selected by the user based on the service utilizing screens is provided to the user, is described above. Alternatively, another method, in which the user accesses the management system 111 from the user terminal 210, displays the service utilizing screens at the user terminal 210, and selects the service indicated based on the display contents, can be applied in the first embodiment.

Figure 12:
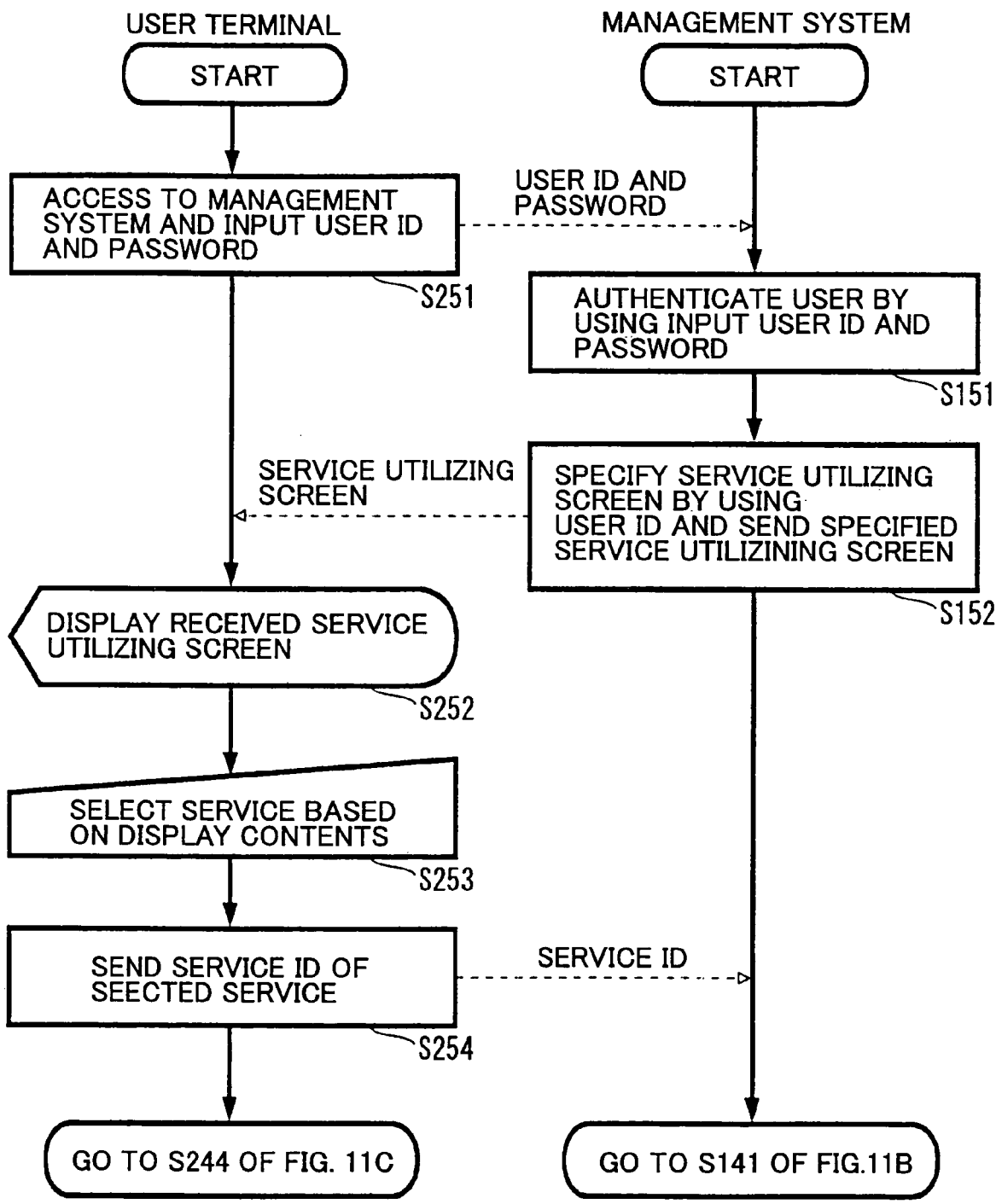
FIG. 12 is a flowchart showing an example of an operation conducted in the service providing step according to the first embodiment of the present invention, especially an example of an operation at a time of utilizing the service from any one of machines provided at the user side.

An operation in this method is illustrated in FIG. 12. Referring to FIG. 12, in this operation, the user accesses the management system 111 through the user terminal 210 and inputs the user ID and the password (step S251). The management system 111 authenticates the user, that is, determines whether or not the user accessing the management system 111 is a registered user by using the user ID and the password input through the Internet 10 (step S151).

When the management system 111 authenticates that the user is a registered user, the management system 111 specifies the service utilizing screens maintained for the user in step S124 in FIG. 10 by using the user ID input by the user and then sending the service utilizing screens to the user terminal 210 (step S152). In this case, a file format for the service utilizing screens is converted so that the service utilizing screens can be displayed on a browser or a like installed to the user terminal 210.

When the user terminal 210 receives the service utilizing screens sent from the management system 111, the user terminal 210 displays the service utilizing screens at the display unit or a like (step S252). The user selects a desired service based on the service utilizing screens displayed at the display unit (step S253), and sends the service ID corresponding to the desired service to the management system 111 through the Internet 10 (step S254).

After that, the management system 111 and the user terminal 210 conduct the operation in accordance with step S141 and step S244 in FIG. 11, and conduct the process for providing the service to the user side 200. In this operation, in a case in which the service to provide is software (service software), it is preferable to configure that the machine 2000 to receive the service software can be indicated from the user side 200. As for this configuration, the management system 111 specifies the machines 2000 capable of executing the service software from the machine IDs in the record in the user information database 121, provides a list of the machines 2000, and the user is allowed to select one machine 2000 from the list.

As described above, the maintenance management side 100 sends the user side 200 available services to provide the user side 200, and the service, which is indicated by the user at the user side 200 based on the available services, is provided from the maintenance management side 100.

*Summary of the Operations

As described above, in the first embodiment, various services are provided from the maintenance management side 100 to the user side 200 based on a machine use number. Each operation of the steps (1) through (5) is just an example to realize the first embodiment. As long as the same object of the present invention is achieved, variations and modifications may be made without departing from the scope of the present invention.

Moreover, each operation can be realized by software. The software for each operation is stored in the storage unit internally or externally provided with each machine 2000, the management system 111, or the user terminal 210, and is read out and executed as necessary.

Services Provided in the First Embodiment

Next, examples of the services provided to the user by the operations above will be described.

As the services provided in the first embodiment, as described above, a discount of the maintenance management charge or free maintenance management, an article of consumption, such as paper sheets and toner, or a like (free service or charged service: in a case of a charged service, a discount is given), a free or charged maintenance service such as a repair, a replacement, and a like (in a case of a charged maintenance service, a discount is given), and a free or charged maintenance service or machine check service (in a case of a charged maintenance service or maintenance check service, a discount is given) can be applied.

In this case, a free copy as the free maintenance management is provided by software. Services other than this service of the free copy are provided by processes conducted by the maintenance management side 100. For example, a discount parameter (percentage) is input to calculate the maintenance management charge and then a charge amount after discount is calculated based on the discount parameter for the discount of the maintenance management. In addition, to provide the service for the free or charged supply product, the management system 111 of the maintenance management side 100 or the staff conducts an order process, so as to provide the service to the user side 200.

Figure 13:
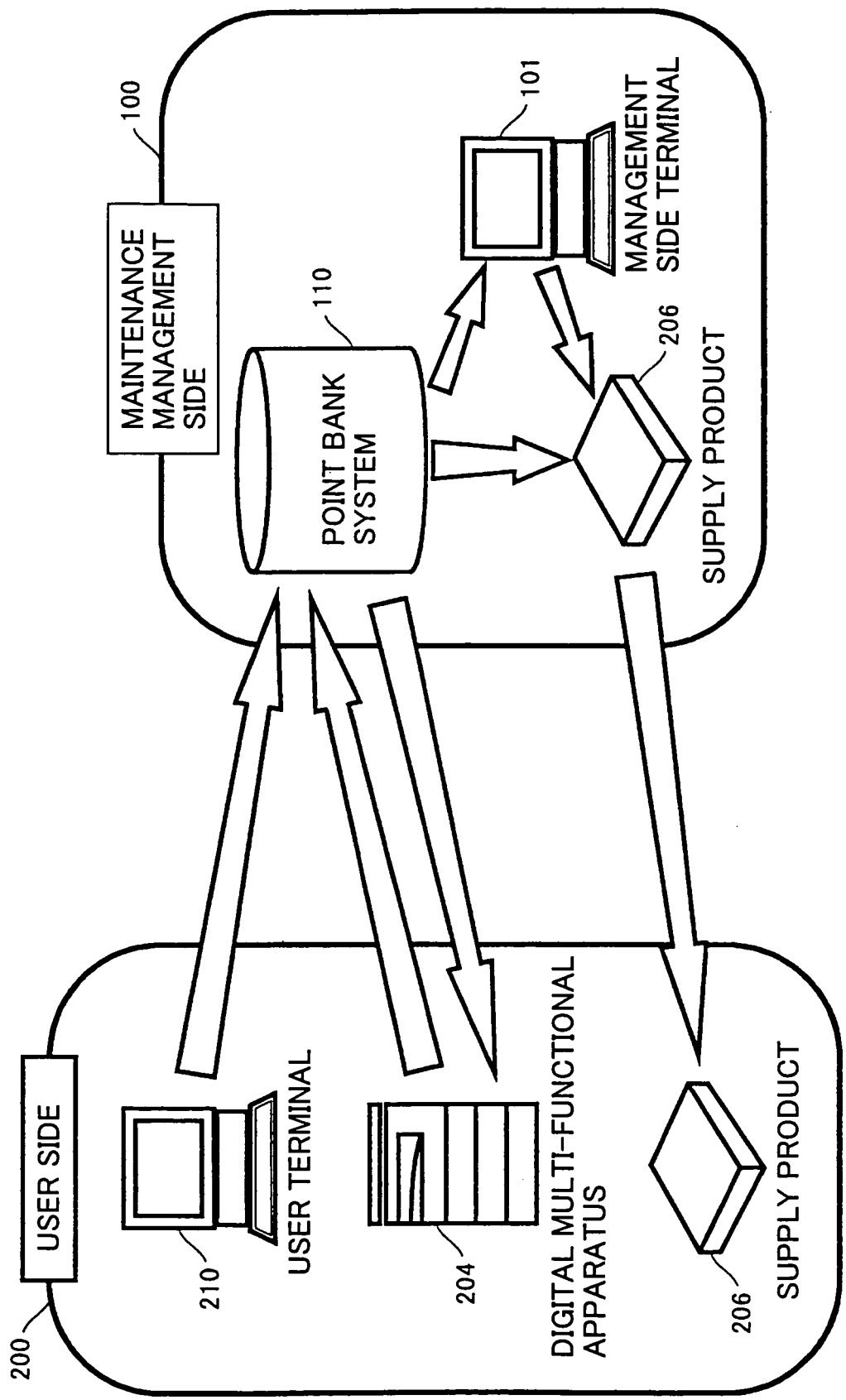
FIG. 13 is a block diagram showing an example of a service flow according to the first embodiment of the present invention.

FIG. 13 shows a service flow. For the sake of convenience, the digital multi-functional apparatus 204 is illustrated as the machine 2000 at the user side 200.

In this case, an indication of a desired service of the user is sent to the point bank system 110 using the user terminal 210 or the digital multi-functional apparatus 204 at the user side 200.

In the point bank system 110, a process corresponding to each service is conducted in response to the indication of the desired service of the user. The service flow will be described for each type of service.

*Case of Providing the Service Software

As services provided by the service software according to the first embodiment, a free service to use the machine 2000 (digital multi-functional apparatus 204), especially, a free service to use the copy function can be illustrated.

By the free service to use the copy function, a process is conducted so that the copy charge by the maintenance management side 100 is set to zero (no charge). This process may be a process in that when the user copies, the counter value in the counter information is not incremented so as to maintain the previous counter value or is replaced with a specific value, or information showing the free copy is additionally provided to the counter information, or the counter information itself is not generated.

When the free service is selected by the user, for example, the point bank system 110 sends the predetermined service software (application) and the predetermined service software is executed in the digital multi-functional apparatus 204. Accordingly, in the digital multi-functional apparatus 204 where the service software is executed, the process described above is conducted for the counter information for the predetermined number of sheets in respect to the free service. As a result, the copying for the number of sheets becomes free (at no charge).

*Case of Discounting a Maintenance Management Charge

In addition to providing the free copying as the free service, as a discount service according to the first embodiment of the present invention, the discount service to discount the maintenance management fee charged by the maintenance management side 100 by a predetermined percentage can be illustrated.

The discount service deducts a percentage included in the service selected by the user, from the maintenance management charge calculated by a system (hereinafter, a billing system) that calculates the maintenance management charge of the maintenance management side 100.

Accordingly, when the discount service is selected by the user at the user side 200, the point bank system 110 sends the billing system the percentage for deducting from the charge for the maintenance management service that the user selects. When the billing system receives the percentage, the billing system deducts a discount amount from the charge for the maintenance management service, which is charged to the user, based on the percentage.

Preferably, the discount service is available for a predetermined period. For example, the discount service may be available for the maintenance management charge incurred within one month. And, the discount service may be available once for a predetermined period. That is, in this manner, it is possible to prevent the user, who has already utilized the discount service for deducting a certain percentage, from utilizing the discount service multiple times within a period available for the discount service.

*Case of Providing a Supply Product

In addition, it is possible to apply a service for providing the supply product 206 to the first embodiment, other than various services described above.

The service for providing the supply product 206 provides a supply product such as paper sheets, toner, or a like, a maintenance service such as the maintenance check or repair maintenance, or other various products by free or charge (if charged, a discount is applied).

When the service for providing the supply product 206 is selected by the user, the point bank system 110 informs the management side terminal 101 that the service is selected. Then, the staff at the maintenance management side 100 conducts an order process to provide the service or the point bank system 110 conducts the order process by itself, and then the supply product 206 is provided to the user side 200.

(Other Examples of Service Utilizing Screens)

Moreover, another example of the service utilizing screens, which are displayed at the machine 2000 or the user terminal 210 at the user side 200, will be described.

The available service list screen shown in FIG. 9A displays the list of available services. Alternatively, another screen hierarchically showing the available services will be described.

FIG. 14A and FIG. 14B show examples of the service utilizing screens. In the service utilizing screens in FIG. 14A and FIG. 14B, the available services are classified into various service types and are hierarchically displayed as selections.

Referring to FIG. 14A and FIG. 14B, as one of the service utilizing screens, first a service type list screen showing the list of the service types that can be provided to the user is displayed at the display unit of the machine 2000 or the user terminal 210 at the user side 200. When the user selects one service type from the service type list screen, an each type available service list screen shown in FIG. 14B is displayed to show available services for the service type selected by the user.

After that, when the user selects one service on the each type available service list screen, the selected service explanation screen shown in FIG. 9B is displayed.

Instead of hierarchically displaying the services for each service type in the service list, the services may be classified into various necessary point values and displayed in the service list.

(Free Service Executing Screen for Predetermined Number of Sheets)

In addition, in the service described above, when the user utilizes the free service for a predetermined number of sheets, it is preferable to show information indicating how many sheets are left for free (no charge) while copying or waiting, at the display unit of the machine 2000 executing the free service.

(Notice of Various Information)

*Providing Various Information by E-Mail or Telephone

Moreover, it is preferable to provide the point balance obtained by accumulating the point value in the point accumulating step (3) described above of the user by e-mail, telephone or a like. If the point balance is provided to the user by e-mail, the management system 111 determines whether or not to provide the point balance calculated in the operation of the point accumulating step (3) of the user. When it is determined that e-mail is to be used, the management system 111 creates a message and sends the message to an e-mail address of the user stored in the user information database 121. Alternatively, if the telephone is to be used, the management system 111 also determines whether or not to provide the point balance of the user. When it is determined that the telephone is to be used, the management system 111 sends the management side terminal 101 information indicating that the telephone is to be used. Then, the management side terminal 101 displays the information and the staff at the maintenance management side 100 calls a telephone number managed in the user information database 121.

*Providing the Point Balance by Printing Out

Furthermore, it is preferable to print out the point balance maintained in the point bank system 110 by the machine 2000 at the user side 200. To realize printing out the point balance at the user side 200, the service utilizing screens provided in the service utilizing screen providing step may be printed out or means for printing out the point balance can be configured in the service utilizing screens provided in the service utilizing screen providing step.

In addition, when the user inputs an instruction of confirming the point value, the machine 2000, which the user input the instruction to, may access the management system 111, obtain information of the point balance from the management system 111, and display the information at the display unit or print out the information.

*Notifying the User about Available Services

Moreover, in the process in step S124 shown in FIG. 10, the management system 111 may detect a new available service, that is, detect that the new available service is additionally provided to the available service list screen (or the each type available service list screen). When the management system 111 determines that the new available service is provided, the management system 111 may send a message to the user by e-mail informing the user about the new available service.

Furthermore, when a candidate service, which can be provided from the maintenance management side 100, is added, the management system 111 may inform the user by e-mail or telephone about the candidate service.

Point Calculating Method in the First Embodiment

Next, a point calculating method will be explained according to the first embodiment of the present invention.

In the first embodiment, various parameters are determined based on the functions (the copy function, the print function, the facsimile sending function, the facsimile receiving function, the scan function, or a like) used by the user and in the contract with the user.

The point calculating method will be described with reference to expressions (1) and (2) as follows.

First, the point value is calculated based on a usage count (counter information) for each machine 2000 in the first embodiment. A calculating method in this case will be described by the expression (1). In this case, it is assumed that the copier 201, the printer 202, the facsimile 203, the digital multi-functional apparatus 204, and the scanner 205 are provided at the user side 200, and the digital multi-functional apparatus 204 includes the copy function, the print function, the facsimile sending function and receiving function, and the scan function.

$$PoC = Pa \times (C^*Ca)$$

$$PoPR = Pb \times (PR^*PRb)$$

$$PoF = Pc \times \{(FS^*FSc) + (FR^*FRc)\}$$

$$PoD = Pd \times \{(C^*Cd) + (PR^*PRd) + (FS^*FSd) + (FR^*FRd) + (S^*Sd)\}$$

$$PoS = Pe \times (S^*Se) \quad \text{expression (1):}$$

In the expression (1), PoC denotes the point value calculated in respect to usage of the copier 201, PoPR denotes the point value calculated in respect to usage of the printer 202, PoF denotes the point value calculated in respect to usage of the facsimile 203, PoD denotes the point value calculated in respect to usage of the digital multi-functional apparatus 204, and PoS denotes the point value calculated in respect to usage of the scanner 205.

Pa denotes a parameter (machine parameter) for weighting the count value concerning the usage of the copier 201, and Ca shows the number of copied sheets.

Pb denotes a parameter (machine parameter) for weighting the count value concerning the usage of the printer 202, and PRb shows the number of printed sheets.

Pc denotes a parameter (machine parameter) for weighting the count value concerning the usage of the facsimile 203, FSc shows the number of sheets (number of facsimile-sent sheets) that are sent by the facsimile 203, and FRc shows the number of sheets (number of facsimile-received sheets) that are received by the facsimile 203.

Pd denotes a parameter (machine parameter) for weighting the count value concerning the usage of the digital multi-functional apparatus 204, Cd shows the number of sheets (number of copied sheets) by the digital multi-functional apparatus 204, PRd shows the number of sheets (number of printed sheets) by the digital multi-functional apparatus 204, FSd shows the number of sheets (number of facsimile-sent sheets) that are sent by the digital multi-functional apparatus 204, FRd shows the number of sheets (number of facsimile-received sheets) that are received by the digital multi-functional apparatus 204, and Sd shows the number of sheets (number of scanned sheets) that are scanned by the digital multi-functional apparatus 204.

Pe denotes a parameter (machine parameter) for weighting the count value concerning the usage of the scanner 205, and Se denotes the number of sheets scanned by the scanner 205.

Furthermore, C denotes a parameter (copy function parameter) for weighting the count value concerning the usage of the copy function, and PR denotes a parameter (print function parameter) for weighting the count value concerning the usage of the print function, FS denotes a parameter (facsimile send function parameter) for weighting the count value concerning the usage of the facsimile send function, FR denotes a parameter (facsimile receive function parameter) for weighting the count value concerning the usage of the facsimile receive function, and S denotes a parameter (scan function parameter) for weighting the value concerning to the usage of the scan function.

Accordingly, in the first embodiment, the point value denoted is calculated depending on the type of the machine 2000 that the user uses or the type of functions. Therefore, it is possible for the maintenance management side 100 to properly calculate the point value depending on the usage of the machine 200, which is relatively expensive to purchase, lease, or maintain and manage, or depending on the function, which costs relatively more to use.

In addition, it is possible for the copy function parameter C to distinguish between a color copy function and a black and white copy function and allocate a different parameter.

Based on the point value calculated for each machine 2000, a total point value is calculated for the user by the following expression (2).

$$Po = K*(Poc + PoPR + PoF + PoD + PoS)$$

In the expression (2), Po denotes the point value calculated for the usage for a predetermined period.

In the first embodiment, the point value is changed based on the contract with the user, especially, the number of the machines 2000 which the user purchases or leases from the maintenance management side 100. That is, in order to provide more services for the user who purchases or leases many machines 2000, a total point value calculated for each machine 2000 is multiplied by a parameter K that is based a contract machine number N. K denotes a parameter (contract machine number parameter) that increases when N is increased. This explanation is for a case in which the contract machine number parameter K is increased by k (>0) every one machine that is increased after a second contract machine number.

The expression (1) is executed in step S115 in FIG. 8, and the expression (2) is executed in step S118 in FIG. 8.

According to the first embodiment, it is possible to provide more services to the user who has contracts for more machines 2000.

In addition, in the first embodiment, it is possible to properly provide the point value to the user even if contents of the contract are changed when the user makes a contract about a new machine 2000, the user changes a machine, for which the user has contracted with another maintenance management side, to the machine 2000 provided by the maintenance management side 100; or the user changes the machine 2000, for which the user has contracted with the maintenance management side 100, to another machine 2000.

That is, for example, the management system 111 provides points A to the user who installs a new machine 2000, points B to the user who replaces the machine provided from another maintenance management side with the machine 2000 provided from the maintenance management side 100, or points C to the user who replaces the machine 2000 currently provided from the maintenance management side 100 with another machine 2000 being a new type provided from the maintenance management side 100.

Accordingly, it is possible to provide advantages to the user who installs a new machine 2000 from the maintenance management side 100 and for the maintenance management side 100 to obtain more users.

Moreover, it is possible to change the point value (points C), which is provided to the user who replaces the current machine 2000 installed from the maintenance management side 100 with another machine 2000, for example, a new type machine 2000, based on contract years. That is, for example, points X are provided to the user who replaces the machine 2000 that has been installed for one to three years, points Y are provided the user who replaces the machine 2000 that has been installed for four to five years, and points Z are provided to the user who replaces the machine 2000 that has been installed for more than six years. The points to provide the user are changed based the contract years of the machine 2000 that is to be replaced. Therefore, in the first embodiment, it is possible for the maintenance management side 100 to set a preferable term for a cycle of the machine 2000 provided to the user. Also, since the points to provide to the user are changed, it is possible for the maintenance management side 100 to provide more services to the user who replaces the machine 2000 in a certain term which is preferable for the maintenance management side 100.

Furthermore, regardless of changes of the contents of the contract, for example, it is possible to provide points to the user who requires less maintenance, such as a repair, within a predetermined term. For example, a maintenance number for each predetermined term may be maintained using the user information database 121 in the point bank system 110. That is, in the predetermined term, points U are provided to the user for whom the maintenance is not performed, points V are provided to the user for whom the maintenance is performed once or twice, and no points are provided to the user for whom the maintenance is performed more than twice. The management system 111 may conduct such a process during each predetermined term. In addition, regarding the maintenance number, the staff of the maintenance management side 100 inputs the maintenance number using the management side terminal 101.

Application of the First Embodiment

In the first embodiment as described above, for each user having a contract, the point value is calculated based the contents of the contract, usage number, and a like and then the service is provided to the user based on the point balance. In a case in which a plurality of sections are recognized as the user having the contract, it is preferable for each section to be the user described in the first embodiment. Each section may be registered as one user to the user information database 121.

Moreover, in the first embodiment, the point balance of the user is displayed when the user instructs. Alternatively, the point balance can be continuously displayed at the display unit of each machine 2000 at the user side 200.

Second Embodiment

In the first embodiment, the counter information is collected from the user side 200, and a specified service is available for the user when the point balance based on the point value calculated from the counter information achieves the point value necessary for each service. Alternatively, in the second embodiment, the specified service can be available for the user at a time the point balance of the user reaches a predetermined value. The second embodiment according to the present invention will be described. FIG. 15 is a diagram for explaining services according to a second embodiment of the present invention.

In the second embodiment, to realize a configuration described above, the machine 2000 at the user side 200 manages candidate services provided with the point information of the user side 200 and various parameters as shown in FIG. 15.

That is, for example, in a case of realizing this in the digital multi-functional apparatus 204 shown in FIG. 15, a storage unit 2041 internally or externally provided to the digital multi-functional apparatus 204 stores the point information of the user side 200, the candidate service to be provided, and the various parameters.

In this configuration, a point value calculated based on the counter information sent from the copier 201, the printer 202, the facsimile 203, the scanner 205, or a like to the maintenance management side 100, and a point value provided based on purchase and utilization of the supply products 206 are sent to the digital multi-functional apparatus 204 and added to the point value in the point information stored in the storage unit 2041. In this case, a transmission of the point value from the management system 111 to the digital multi-functional apparatus 204 is preferably conducted in a time frame in which the network (the Internet 10, the public line 20, or a like) is not experiencing heavy use.

In order to manage the candidate service provided in the digital multi-functional apparatus 204, contents stored in the service database 123 at the maintenance management side 100 are also sent to the digital multi-functional apparatus 204 through the network (the Internet 10, the public line 20, or a like). In this case, this transmission of the contents stored in the service database 123 from the management system 111 to the digital multi-functional apparatus 204 is preferably conducted when a service content to be provided is changed. This transmission is preferably conducted in a time frame in which the network (the Internet 10, the public line 20, or a like) is not experiencing heavy use.

Moreover, each time a function mounted to the digital multi-functional apparatus 204 is used, the digital multi-functional apparatus 204 calculates the point value based on the parameter stored in the storage unit internally or externally provided thereto, and adds a calculation result to the point value in the point information. Furthermore, the point information managed by the digital multi-functional apparatus 204 is sent to the point bank system 110. Thus, the point bank system 110 can also manage the point information.

That is, in a process according to the second embodiment, the point bank system 110 at the maintenance management side 100 receives the point information (point balance) based on the counter information sent from each machine 2000 provided at the user side 200, and stores a calculation result to the user information database 121. Moreover, the point bank system 110 (management system 111) sends the point information obtained after the above calculation to the machine 2000 at the user side 200 through the network (the Internet 10, the public line 20, or a like). It should be noted that the machine 2000 to send the point information is indicated by the user side 200 or the maintenance management side 100 beforehand and is a machine that can realize means (capable of executing a program) for calculating the point value based on the counter information therein.

When the machine 2000 receives the point information, the machine 2000 updates the point information of the user side 200 managed in the storage unit internally or externally provided to the machine 2000 itself, by the point information received from the point bank system 110.

When the point balance reaches a predetermined value (necessary point value for the service managed in the storage unit above), the machine 2000 creates the service utilizing screens by an operation similar to the operation in accordance with steps 123 and 124 in FIG. 10, and stores the service utilizing screens to the storage unit. The service utilizing screens are displayed at the display unit as necessary.

That is, for example, the digital multi-functional apparatus 204 according to the second embodiment creates the service utilizing screens, triggered when the point balance maintained as described above reaches a predetermined value, and stores the service utilizing screens to the storage unit of the digital multi-functional apparatus 204. The predetermined value is the point value to be subtracted for the service managed in the digital multi-functional apparatus 204.

The digital multi-functional apparatus 204 can be configured to conduct a part of or the entire operation of the management system 111 in the first embodiment, so as to realize an operation according to the second embodiment described above. Thus, a detailed explanation thereof will be omitted.

According to the second embodiment, it is possible to utilize the service desired by the user at a time of reaching the predetermined point value in the digital multi-functional apparatus 204. That is, in the first embodiment, the user cannot utilize the specific service until the point value managed in the point bank system 110 reaches the predetermined point value. However, in the second embodiment, the user can utilize the specific service at the time the point value managed in the digital multi-functional apparatus 204 reaches the predetermined point value. Therefore, it is possible to provide the specific service to the user earlier than in the first embodiment. In addition, in the second embodiment, in a case of using the service software according to the first embodiment, no transmission is required between the digital multi-functional apparatus 204 and the point bank system 110 through the network (the Internet 10, the public line 20, or a like). Accordingly, it is possible to reduce a transmission fee to be paid by the user side 200 or the maintenance management side 100.

In addition, when the point balance managed in the digital multi-functional apparatus 204 according to the second embodiment reaches a certain value, the digital multi-functional apparatus 204 displays information of the point balance. When a new available service is added by an updated point balance, the digital multi-functional apparatus 204 displays available services according to the updated point balance at the display unit.

In the second embodiment, the digital multi-functional apparatus 204 is illustrated as the machine 2000 at the user side 200 but it is not limited to the digital multi-functional apparatus 204. Any machine 2000 that can conduct the operation or the process according to the second embodiment can be used.

In the second embodiment, other configurations and operations are the same as those in the first embodiment, and explanations thereof will be omitted.

Third Embodiment

Figure 16:
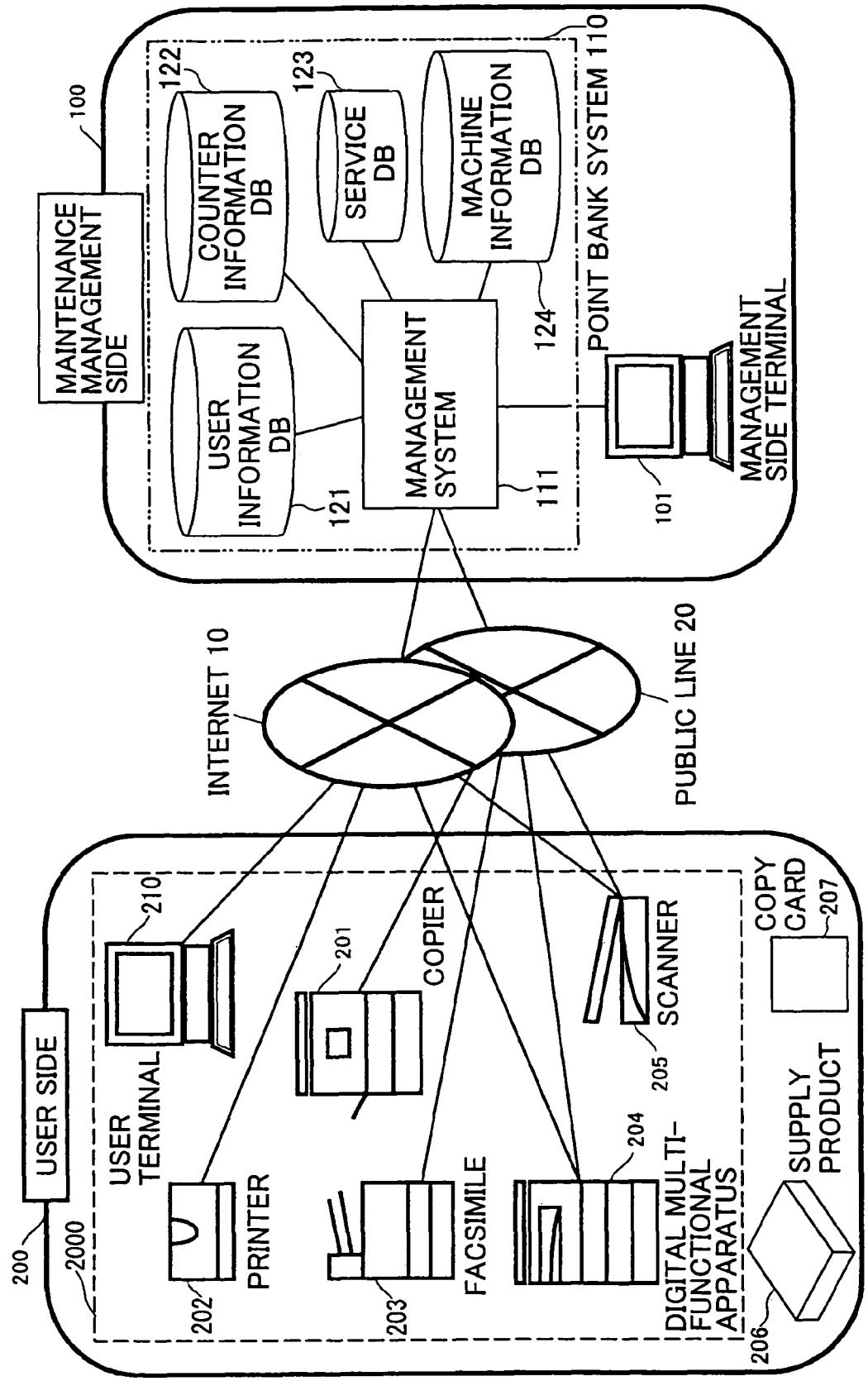
FIG. 16 is a diagram for explaining services according to a third embodiment of the present invention.

Moreover, a case in which the counter information is managed using a copy card will be described with reference to FIG. 16, FIG. 17, and FIG. 18 according to the third embodiment. FIG. 16 is a diagram for explaining services according to a third embodiment of the present invention. FIG. 17 is a table showing an example of a data structure of a counter information database 122 according to the third embodiment of the present invention. FIG. 18 is a table showing an example of a data structure of a user information database 121 according to the third embodiment of the present invention.

In the third embodiment, the point value can be managed for each section, each individual (each copy card 207), or each machine 2000 as shown in FIG. 16. That is, the user is allowed to select one of collecting the counter information from each machine 2000 in the contract so as to integrate the counter information and calculating the point value based on the integrated counter information, managing the counter information for each copy card and calculating the point value for each copy card, or managing the counter information for each machine 2000 and calculating the point value for each machine 2000. In this case, the counter information includes a card ID identifying the copy card as well as information illustrated in the first embodiment. Also, in this case, the counter information database 122 includes the card ID as an additional item as shown in FIG. 17.

As shown in FIG. 18, the card ID (card ID group) is also additionally provided as an item to be stored in the user information database 121 shown in FIG. 3, and the contents of the contract include a selection by the user for calculating the point value as described above. The selection is indicated in the contract when the contract is agreed to or the contract is changed after being agreed to.

Accordingly, based on the contents of the contract described above, the point information managed in the point bank system 110 can be integrated, or managed for each copy card or each machine 2000.

The service utilizing screens to be provided may be shared with all machines 2000, or created for each machine 2000 or each copy card. In a case in which the service utilizing screens are created for each copy card, the service utilizing screens may be stored in each machine 2000 if the service utilizing screens are for the same user. On the other hand, in a case in which the service utilizing screens are created for each machine 2000, the service utilizing screens may be stored in respective machines 2000.

In the third embodiment, in a case in which the point value is managed for each copy card, the point balance, the service utilizing screens, and a like can be confirmed or utilized by using the copy card.

Moreover, in the third embodiment, the management for each copy card is described but the present invention is not limited to this management method for each copy card. Alternatively, as long as an individual, a section, or a predetermined classification is distinguishable, variations and modifications may be made without departing from the scope of the present invention.

Fourth Embodiment

In addition, in a machine or a function that is not subject for the maintenance management, for example, the usage number of the printer, the facsimile, those functions, or a like can be subject for the point calculation only if the contract for the printer, the facsimile, those functions, or a like is made.

In the fourth embodiment, it is possible to obtain revenue from not only maintenance management for the copier 201 and the digital multi-functional apparatus 204 but also maintenance management for the printer 202 and the facsimile 203. In addition, as the service provided to the user, a free or discount copy or supply product can be applied and also a print charge or a facsimile receive charge can be zero (no charge) or discounted.

In the fourth embodiment, the user may pay for a charge corresponding to the usage of each machine 2000 in respect to the maintenance management side 100. Also, the maintenance management side 100 may provide more improved service such as support for each machine 2000.

Preferably, the user can select the machines 2000 to include in the contract. Moreover, as for the maintenance management fee in respect to the printer 202 or the facsimile 203, a predetermined money amount may be charged based on the printed sheet number and the facsimile send or receive number. When the contract is made or at a predetermined period, a fixed money amount may be paid by the user.

Therefore, in a point bank system in a first view according to the present invention, it is possible to provide services suitable for each user. That is, based on the usage number of the machines provided at the user side, and the point value necessary to utilize the services, it is possible to provide more services or higher quality services for the user having a greater usage number. In addition, as for the maintenance management side providing the machine, a greater installed number of the machines and a greater usage number can be expected. Accordingly, it is possible to receive a higher benefit.

Moreover, in the point bank system in a second view according to the present invention, it is possible to provide more specific services suitable for each user. That is, for the same user, it is possible to provide more services or higher quality services to an individual or a section that uses the machine more.

Furthermore, in the point bank system in a third view according to the present invention, it is possible to utilize the services by using an accumulative point value at the machine at the user side. Thus, it is possible to provide an environment allowing the user to easily utilize the services. In addition, the maintenance management side can improve the value for utilizing the services provided according to the present invention. Thus, it is possible to have an increase of the number of the users who make use of the services according to the present invention.

Moreover, in a machine in a fourth view according to the present invention, it is possible to confirm the point balance in respect to an accumulative point value at the machine at the user side. Thus, it is possible to promote increased use of the machine to the user.

Furthermore, in the machine in a fifth view according to the present invention, it is possible to utilize the services by using the accumulative point value at the machine at the user side. Thus, it is possible to provide an environment allowing the user to easily utilize the services. In addition, the maintenance management side can improve the value for utilizing the services provided according to the present invention. Thus, it is possible to have an increase of the number of the users who make use of the services according to the present invention.

Moreover, in the machine in a sixth view according to the present invention, since the point balance is managed at the machine at the user side, it is possible to promptly provide the services to the user at a time when the point balance reaches a predetermined value. In addition, the maintenance management side can improve the value for utilizing the services provided according to the present invention. Thus, it is possible to have an increase of the number of the users who make use of the services according to the present invention.

Furthermore, in the machine in a seventh view according to the present invention, it is possible to promptly utilize the services based on the accumulative point value at the machine at the user side. In addition, since the maintenance management side can improve the value for utilizing the services provided according to the present invention, it is possible to have the increase of the number of the users who make use of the services according to the present invention.

Moreover, in the machine in an eighth view according to the present invention, it is possible to provide services that can be free corresponding to usage of the machine.

Furthermore, in a terminal in a ninth view according to the present invention, it is possible to confirm the point balance of any one of terminals from that terminal itself at the user side. Thus, it is possible to encourage the user to use the machines more.

Moreover, in the terminal in a tenth view according to the present invention, it is possible to utilize the services based on the point balance of any one of the terminals from that terminal itself at the user side. Thus, it is possible to have an environment allowing the user to utilize the services in a state suitable for the user.

Furthermore, in a method in an eleventh view according to the present invention, it is possible to provide the services that meet requirements for each user. That is, since a necessary point value to utilize the services is given based on a usage number of the machine provided at the user side, it is possible to provide more services or higher quality services for the user whose usage number is greater. In addition, since the maintenance management side providing the machine can expect an increase of installation of the machines and the usage number of the machines, it is possible to improve profits.

Moreover, in the method in a twelfth view according to the present invention, it is possible to provide or utilize the services properly to or by each user based on the machines or functions used by the user and the number of the machines contracted by the user.

Furthermore, in the method in a thirteenth view according to the present invention, it is possible to provide more services or higher quality service in respect to the user who installs a new machine or replaces an installed machine with a new machine. Thus, it is possible to improve the installation rate of the machines. In addition, it is possible to provide a service suitable to a new installation or a machine replacement, to the user side.

Moreover, in the method in a fourteenth view according to the present invention, it is possible to provide more services or higher quality services to the user who replaces the machine. Thus, it is possible to determine a cycle of replacing the machine closer to a period desired by the maintenance management side.

Furthermore, in the method in a fifteenth view according to the present invention, it is possible to provide an additional point value for a purchase or utilization of a supply product, charged maintenance, or a repair provided by the maintenance management side as well as the usage of a machine, the new installation of a machine, or the replacement of a machine. Thus, it is possible to provide the services considering more purchases or more utilization. In addition, it is possible for the maintenance management side to receive an increase of the purchases and the installation rate and also to receive an improvement of the profit.

Moreover, in the method in a sixteenth view according to the present invention, it is possible to provide the services based on the accumulative point value. Thus, it is possible to receive an increase of machine installations and machine usage. In addition, it is possible for the user to receive the services corresponding to the machine installed from the maintenance management side and the machine usage. Thus, it is possible to increase the number of the users who make use of the services according to the present invention.

Furthermore, in the method in a seventeenth view according to the present invention, since the point balance is managed at the machine at the user side, it is possible to promptly provide the services to the user at the time the point balance reaches a predetermined value. In addition, since the maintenance management side can improve the value for utilizing the services provided according to the present invention, it is possible to receive an increase of the number of the users who make use of the services according to the present invention.

Moreover, in the method in an eighteenth view according to the present invention, it is possible to promptly provide the services based the accumulative point value in the machine at the user side. In addition, since the maintenance management side can improve the value for utilizing the services provided according to the present invention, it is possible to receive an increase of the number of the users who make use of the services according to the present invention.

Furthermore, in the method in a nineteenth view according to the present invention, it is possible to provide free services corresponding to usage of the machine.

The invention claimed is:

1. An information processing apparatus functioning as a point bank system including at least a user information database and a counter information database for managing a point value calculated based on a usage number of a group of image formation machines provided at a user side, comprising:
   a user information managing part configured to manage a point balance and machine identifications of the group of machines by storing to a user information database said point balance and said machine identifications of the group of machines corresponding to the user side;
   a usage number maintaining part configured to maintain the usage number for each of the group of machines by storing to the counter information database said usage number collected from the user side through a network,
   a point exchanging part configured to exchange the usage number for each of the group of machines maintained in the counter information database for the point value;
   a calculating part configured to calculate a total of the point value for the group of machines identified by the machine identifications corresponding to the user side by referring to the user information database;
   a point accumulating part configured to accumulate the point value of the user side by adding the total of the point value calculated by the calculating part to the point balance corresponding to the group of machines corresponding to the user side in the user information database;

a candidate service determining part configured to determine at least one candidate service to display at one or more of the group of machines at which one or more users operate at the user side, based on the point value calculated based on usage of the group of machines and accumulated in said user information database for the group of machines at the user side, a service utilizing screen creating part configured to create a service utilizing screen for utilizing the at least one candidate service determined by the candidate service determining part, a service utilizing screen sending part configured to send the service utilizing screen created by the service utilizing screen creating part to each of the image formation machines in the group of machines at the user side, whereby a common service utilizing screen is available at any one of machines in the group of machines at the user side, and a service providing part configured to provide the service, which the user selects from the service utilizing screen at the machine at the user side, based on a service selection sent from the machine, whereby the service is provided to the user based on the point value accumulated in the point bank system.

2. The information processing apparatus as claimed in claim 1, wherein:

said user side comprises at least one section;

said point exchanging part exchanges said usage number for each section; and said point accumulating part accumulates said point value for each section.

3. An image forming apparatus functioning as one of a copier, a printer, a facsimile, and a digital multi-functional apparatus, which is provided to a user side and capable of connecting to a point bank system managing a point value calculated based on a usage number of a group of image formation machines provided at the user side, comprising:

a usage number sending part configured to send a self usage number of the image forming apparatus to the point bank system;

a service utilizing screen receiving part configured to receive a service utilizing screen from said point bank system that provides the service to a user based on an accumulative point value calculated based on usage of the group of machines and which indicates a total of the point value for the group of machines provided at the same user side;

a service utilizing screen displaying part configured to display the service utilizing screen at a display unit for an operation of an image formation by the user; and a selected service sending part configured to send a service selection, which is input by the user based on the service utilizing screen displayed by the service utilizing screen displaying part, to the point bank system;

whereby the service utilizing screen is displayed as a common service utilizing screen available at any one of the image formation machines in the group associated with the image forming apparatus, and the service is provided to the user based on the point value accumulated in the point bank system.

4. An image forming apparatus functioning as one of a copier, a printer, a facsimile, and a digital multi-functional apparatus, which is provided to a user side and capable of connecting to a point bank system managing a point balance calculated based on a usage number of a group of image formation machines provided at the user side, comprising:

a storage area configured to store point information, candidate services, and a parameter to exchange a self usage number of the image forming apparatus for a current point value;

a total point receiving part configured to receive a total of point values in the group associated with the image forming apparatus, from the point bank system, and to update the point information with the total of point values;

a point exchange part configured to exchange the self usage number to a current point value of the image forming apparatus when the image forming apparatus is used, to add the current point value to the total of point values indicated in the point information, and to send the current usage number to the point bank system; and a service utilizing screen creating part configured to create a service utilizing screen by using at least one candidate services, when the total of point values achieves a predetermined value to utilize the service;

whereby the service is provided to the user based on the point value accumulated in the group associated with the image forming apparatus.

5. The image forming apparatus as claimed in claim 4, further comprising:

a service utilizing screen displaying part configured to display the service utilizing screen created by said service utilizing screen creating part;

a service selection obtaining part configured to allow a user of said machine to select the service as a service selection from said candidate service shown in the service utilizing screen so as to obtain the service selection; and a service selection processing part configured to process said service selection by either one of providing the service to the user based on said service selection and sending said service selection input by the user to the point bank system connected through a network.

6. A computer-implemented method performed in a computer for managing a point value calculated based on a usage number of a group of image formation machines provided at a user side, the computer comprising a processor and computer readable medium storage having stored thereon a set of instructions which, when executed by the computer, cause the computer to perform steps of the computer-implemented method comprising:

(a) managing a point balance and machine identifications of the group of machines by storing to a user information database said point balance and said machine identifications of the group of machines corresponding to the user side;

(b) maintaining the usage number for each of the group of machines by storing to a counter information database, said usage number collected from the user side through a network;

(c) exchanging a usage number for each of group of machines provided at the same user side for the point value;

(d) calculating a total of the point value for the group of machines identified by the machine identifications corresponding to the user side by referring to the user information database;

(e) accumulating the point value of the user side by adding the total of the point value to the point balance corresponding to the group of machines corresponding to the user side in the user information database;

(f) determining at least one candidate service to display at one or more of the group of machines at which one or more users operate at the user side, based on a total of the point value calculated based on usage of the group of machines and exchanged for the usage numbers of the group of machines provided at the same user side;

(g) creating at least one service utilizing screen for utilizing the at least one candidate service determined by the candidate service determining part;

(h) sending the service utilizing screen created by the service utilizing screen creating part to each of the image formation machines in the group of machines at the user side, whereby a common service utilizing screen is available at any one of machines in the group of machines at the user side; and (i) providing the service, which the user selects from the service utilizing screen at the machine at the user side, based on a service selection sent from the machine;

whereby the service is provided to the user based on the point value accumulated in the point bank system.

7. The method as claimed in claim 6, wherein said step (c) exchanges the usage number of each machine for the point value based on any selection of each machine, each job type executed by the machine, and a number of machines of the group of machines provided at the user side.

8. The method as claimed in claim 6, wherein said step (c) comprises the step of (j) setting a predetermined point value to the user who installs a new machine and/or replaces an installed machine with another machine.

9. The method as claimed in claim 8, wherein said step (j) sets the predetermined point value, which is for the user who replaces the installed machine with the other machine, to be a different point value corresponding to contract years of the installed machine.

10. The method as claimed in claim 6, wherein said step (c) comprises the step of setting a predetermined point value for the user who purchases or utilizes a supply product.

11. A computer-implemented method performed in a computer for managing a point value calculated based on a usage number of a group of image formation machines provided at a user side, the computer comprising a processor and computer readable medium storage having stored thereon a set of instructions which, when executed by the computer, cause the computer to perform steps of the computer-implemented method comprising:

(a) determining at least one candidate service to provide, based on a total of the point value calculated based on usage of the group of machines and exchanged from a usage number of the group of machines provided at the same user side;

(b) creating a service utilizing screen for utilizing the service based on the candidate service determined in said step (a);

(c) sending the service utilizing screen to each of the group of machines provided at the same user side to display at a display unit for an operation of an image formation, whereby a common service utilizing screen is available at any one of machines in the group of machines at the user side; and (d) providing the service selected by the user, based on a service selection which the user input based on the service utilizing screen displayed at one of the group of machines provided at the same user side, whereby the service is provided to the user based on the point value accumulated in the point bank system.

12. A computer readable medium storage comprising a program product having instructions stored thereon which, when executed by a machine of a group of image formation machines which is provided to a user side and capable of connecting to a point bank system managing a point balance calculated based on a usage number of the group of machines for image formation provided at the user side, cause the machine to perform a method comprising:

storing point information, candidate services, and a parameter to exchange a self usage number of the image forming apparatus for a current point value;

receiving a total of point values in the group associated with the image forming apparatus, from the point bank system, and updating the point information with the total of point values;

exchanging the self usage number to a current point value of the image forming apparatus when the image forming apparatus is used, adding the current point value to the total of point values indicated in the point information, and sending the current usage number to the point bank system; and creating a service utilizing screen by using at least one candidate service when the total of point values achieves a predetermined value to utilize the service;

whereby the service is provided to the user based on the point value accumulated in the group associated with the image forming apparatus.

13. The computer readable medium storage as claimed in claim 12, wherein the program product has instructions stored thereon which cause the machine to perform a method comprising:

displaying a service utilizing screen created by a service utilizing screen creating part;

allowing a user of the machine to select a service as a service selection from the candidate service shown in the service utilizing screen so as to obtain the service selection; and processing the service selection by either one of providing the service to the user based on the service selection and sending the service selection input by the user to the point bank system connected through a network.

14. The point bank system of claim 1, comprising:

a service database including items of a service ID identifying a service, a required point value to be deducted to utilize the service, a service explanation, and service information to realize an operation for actually providing the service, wherein by referring to the required point value of the service database, the candidate service determining part determines at least one candidate service to provide.

15. The point bank system of claim 1, wherein the machine sends the usage number of the machine to the point bank system at a predetermined period.

16. The point bank system of claim 1, wherein the point bank system requests each of the image formation machines in the group to send the usage number of the machine to the point bank system at a predetermined period.

17. The point bank system of claim 1, wherein the usage number maintaining part maintains the usage number for a job at each of the image formation machines by items of a machine ID identifying the image formation machine and a job ID identifying a job type of the image formation machine, the point bank system further comprising an acquiring part acquiring the usage number for each job ID of the image formation machine by using the machine ID and the usage number maintaining part.

18. The point bank system of claim 1, wherein the service utilizing screen created by the service utilizing screen creating part includes an available service list for a current point balance, and a required point value when each service listed in the available service list is utilized.

19. The point bank system of claim 18, wherein the available service list allows a user to select one of services listed therein.

\* \* \* \* \*